(12) United States Patent
Novick et al.

(10) Patent No.: US 7,315,488 B2
(45) Date of Patent: Jan. 1, 2008

(54) METHODS AND SYSTEMS FOR PASSIVE RANGE AND DEPTH LOCALIZATION

(75) Inventors: Arnold W. Novick, Providence, RI (US); Kenneth J. McPhillips, Warren, RI (US)

(73) Assignee: Raytheon Company, Waltham, MA (US)

( * ) Notice: Subject to any disclaimer, the term of this patent is extended or adjusted under 35 U.S.C. 154(b) by 42 days.

(21) Appl. No.: 11/422,435

(22) Filed: Jun. 6, 2006

(65) Prior Publication Data
US 2007/0280051 A1 Dec. 6, 2007

(51) Int. Cl.
*G01S 3/808* (2006.01)
(52) U.S. Cl. .................................... 367/125; 367/127
(58) Field of Classification Search ............... 367/127, 367/125, 124, 118
See application file for complete search history.

(56) References Cited

U.S. PATENT DOCUMENTS

| 4,312,053 A | * | 1/1982 | Lipsky ..................... 367/127 |
| 5,420,827 A | * | 5/1995 | Feintuch ................... 367/127 |
| 6,160,758 A | * | 12/2000 | Spiesberger .............. 367/127 |
| 7,266,042 B1 | * | 9/2007 | Gent et al. ................ 367/118 |

* cited by examiner

*Primary Examiner*—Daniel Pihulic
(74) *Attorney, Agent, or Firm*—Daly, Crowley, Mofford & Durkee, LLP

(57) ABSTRACT

A to method and system provide a range and depth localization of a passive sound generator, e.g., a submarine target. The method and system use an autocorrelation and/or a cross correlation to arrive at a plurality of range versus depth estimates, which are resolved and evaluated using likelihood factors in order to provide a range and depth localization.

23 Claims, 14 Drawing Sheets

METHODS AND SYSTEMS FOR PASSIVE RANGE AND DEPTH LOCALIZATION

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to acoustic methods and systems and, more particularly, to methods and systems, providing a range/depth localization of a passive sound generator, e.g., a submarine target.

BACKGROUND OF THE INVENTION

It is known that an underwater vessel (i.e., a submarine) generates sound, which is generally referred to as passive sound, as it travels through the water. The passive sound is generated by a variety of sources, including, but not limited to, sound generated by a submarine propulsion system, sound generated by a submarine propeller, and sound generated by a submarine electrical power generator. It is known that submarine designers attempt to reduce these and other passive sound sources in order to make a submarine difficult to detect by acoustic means, therefore remaining as covert as possible.

Some anti-submarine warfare (ASW) sonar systems attempt to detect the passive underwater sound generated by an enemy submarine. Some other ASW sonar systems attempt to both detect the passive sound and also to localize and/or track the enemy submarine. Localization is used to identify a position of the enemy submarine in azimuth, and/or in range, and/or in depth.

Passive ASW sonar systems attempt to detect, localize, and/or track the enemy submarine using the received passive sound only. The passive sonar system can remain covert and undetectable by the enemy submarine. Some known passive sonar systems use beamforming techniques to generate receive beams. The receive beams can be steered azimuthally to detect, localize, and/or track the enemy submarine in azimuth. The receive beam can also be steered to vertical angles.

Even at relatively short ranges, localization in depth and range is not generally possible when receiving only passive sound and depending upon a pointing direction of receive beams (directed to a vertical beam steer angle). This is because for any receive beam and associated vertical beam that points toward an enemy submarine, the enemy submarine can be positioned at an essentially infinite number of depths and ranges along the vertical beam steer angle.

At longer ranges, localization of the enemy submarine in range and depth is made even more difficult by a variety of factors, including but not limited to, a tendency of the passive sound generated by the enemy submarine to bend (i.e., refract), primarily in a vertical direction, as the sound propagates through the water. Therefore, the vertical angle at which the greatest amount of sound arrives at the sonar system, which is related to a particular receive vertical beam angle, does not necessarily point in the direction of the enemy submarine. Therefore, other techniques must be used to localize the target in range and in depth.

Narrowband, or matched field processing, is a known technique used to localize in range and in depth. However, narrowband processing requires a large sonar array, which is not practical for many applications. Narrowband processing also suffers from the affects of the above-described sound refraction.

Broadband autocorrelation processing is a known technique in which a signal received by a sonar element (i.e., sonar transducer), or a sonar array, is autocorrelated to identify a relative time delay between the passive sound arriving at the sonar element on a direct sound path and the passive sound arriving at the sonar element on a surface-reflected sound path. The relative time delay can be used to calculate range and depth. However, the performance of this technique can be greatly degraded at moderate to high sea states (i.e., when the sea surface has high waves), due to scattering of the sound reflected from the surface, which causes the autocorrelation to degrade.

SUMMARY OF THE INVENTION

A method of determining a range and a depth of an underwater target includes receiving a sound signal from the target, wherein the sound signal includes a plurality of sound signal portions, each one of the sound signal portions propagating on a respective one of a plurality of propagation paths, wherein any two of the propagation paths correspond to a propagation path pair. The method further includes converting the sound signal to one or more electronic signals and generating a correlation signal associated with at least one of the one or more electronic signals. The method further includes identifying a correlation feature in the correlation signal and measuring a parameter of the identified correlation feature. The method further includes assuming a depth of the target, selecting a propagation path pair associated with the identified correlation feature and with the assumed depth, and estimating a range of the target at the assumed depth using the selected propagation path pair. The process further includes processing the estimated range of the target at the assumed depth to provide a resolved range of the target at the assumed depth and an associated first resolved propagation path pair and assigning a likelihood factor to the resolved range of the target at the assumed depth.

A system for determining a range and a depth of an underwater target includes at least one sound transducer adapted to receive a sound signal from the target, wherein the sound signal includes a plurality of sound signal portions, each one of the sound signal portions propagating on a respective one of a plurality of propagation paths, wherein any two of the propagation paths correspond to a propagation path pair. The at least one sound sensor is adapted to convert the sound signal to one or more electronic signals. The system further includes a correlation processor adapted to generate a correlation signal associated with at least one of the one or more electronic signals. The system further includes a correlation feature identification processor adapted to identify a correlation feature in the correlation signal and a correlation feature parameter measurement processor adapted to measure a parameter of the identified correlation feature and to generate measured correlation feature values. The system further includes a path pair identification processor adapted to assume a depth of the target and adapted to select a propagation path pair associated with the identified correlation feature and with the assumed depth. The system further includes an estimated range/assumed depth processor adapted to estimate a range of the target at the assumed depth using the selected propagation path pair. The system further includes a range resolution processor adapted to process the estimated range of the target at the assumed depth to provide a resolved range of the target at the assumed depth and an associated first resolved propagation path pair and a likelihood estimation processor adapted to assign a likelihood factor to the resolved range of the target at the assumed depth.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
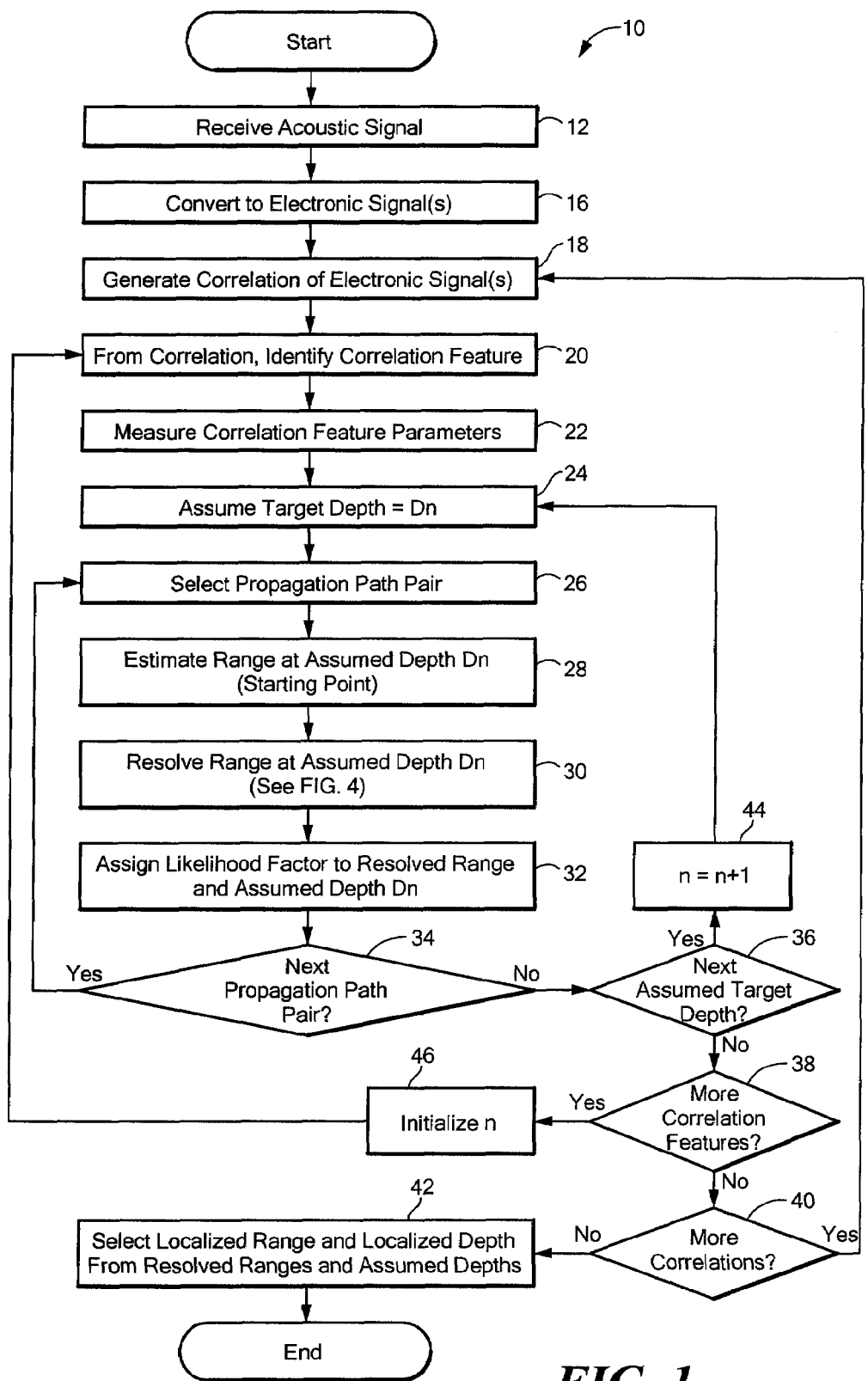
FIG. 1 is a flow chart showing a process of determining a range and a depth of an underwater target.

Before describing the method and system for passive range and depth localization, some introductory concepts and terminology are explained. As used herein, the term "passive sound" is used to described sound generated by an object, which is not generated in order to provide an acoustic function. For example, a submarine, when traveling through the water, generates passive sound from a propulsion system, from a propeller, from an electrical power plant, and from flow-induced vibrations. The passive sound can have a variety of spectral characteristics, both narrowband and broadband, which are representative of the type of target (e.g., surface ship, submarine, etc.)

As used herein, the term "active sound" is used to describe sound that is intentionally generated by an object in order to provide an acoustic function. For example, the submarine can transmit active sound into the water with an active sonar system in order to receive return echoes from objects in or in contact with the water.

It is known that both passive and active sound can travel through the water in so-called "propagation paths," which can be non-straight paths, particularly when the propagation paths extend over appreciable distances, e.g., miles. The propagation paths can be modeled with propagation models. Some propagation models assume that the sound travels in straight propagation paths. These models are often referred to as isovelocity models, since they presume that sound travels at the same sound speed at all water depths. Other propagation models do not assume that the sound travels in straight propagation paths. These models, which are sometimes referred to as "ray trace" models, can be used to more accurately predict the sound propagation paths and the resulting sound that arrives at a point in the ocean, for example at a sonar system that receives passive sound from an underwater target. Other propagation models accomplish the equivalent function but are less computationally convenient.

As is also known, sound that travels underwater can often take more than one propagation path. For example, sound can take a direct propagation path from a sound source to a sound receiver. The sounds can also travel upward from the sound source, on a so-called "surface reflected path," reflecting (or scattering) from the surface of the water and traveling downward to the sound receiver. The sound can also travel downward from the sound source, on a so-called "bottom reflected path," reflecting (or scattering) from the bottom of the water basin and traveling upward to the sound receiver. The sound can also take a variety of other propagation paths, having, for example, both a surface and a bottom reflection (or scattering) or more than one surface and bottom reflection (or scattering).

Through there exist a very large number of sound propagation paths between s sound source and a sound receiver, some of the propagation paths are dominant, i.e., sound received at a sound receiver will have an intensity largely from the dominant sound paths. In particular, because sound tends to lose intensity each time it reflects or scatters from the surface or the bottom, the propagation paths having the strongest sound intensity when received at a sound receiver tend to be the direct path, the surface reflected path, and the bottom reflected path. However, a surface to bottom reflected path and a bottom to surface reflected path can also be considered as well as paths with multiple boundary contacts.

While the systems and techniques described below are described in conjunction with underwater passive sound generators, for example, a submarine, the systems and techniques are not limited to water acoustics, but also apply to air acoustics and air passive sound generators, for example, an aircraft.

Figure 12:
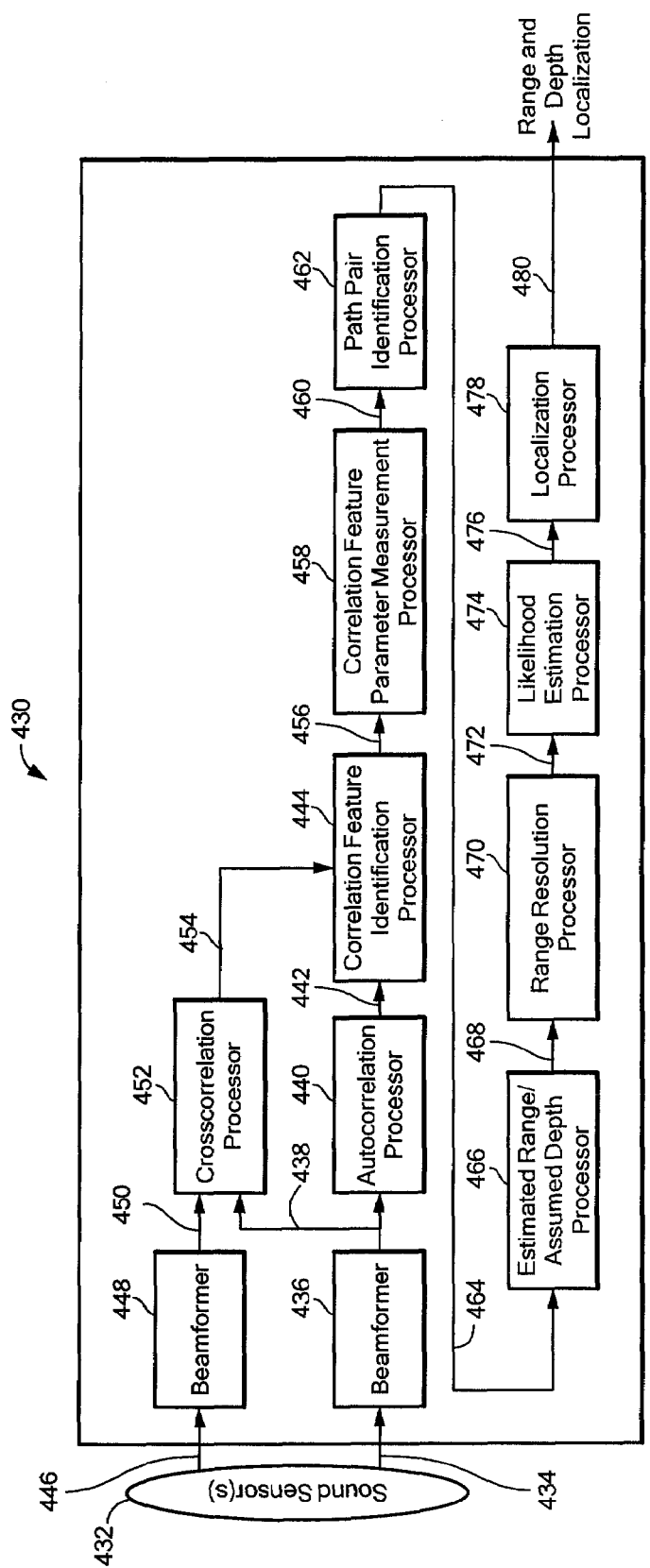
FIG. 12 is a block diagram of a system for determining a range and a depth of an underwater target.

It should be appreciated that FIGS. 1-4 show flowcharts corresponding to the below contemplated technique which would be implemented in a processor 430 (FIG. 12). The rectangular elements (typified by element 12 in FIG. 1), herein denoted "processing blocks," represent computer software instructions or groups of instructions. The diamond shaped elements (typified by element 34 in FIG. 1), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring to FIG. 1, a method of determining a range and a depth of an underwater target (i.e., localizing the target in range and depth) begins at block 12, where a passive acoustic signal, generated by a target, is received at a sonar system. The sound signal travels on at least two propagation paths, i.e., a first and a second propagation path, to the sonar system, which receives and processes the sonar signal. Therefore, the sonar signal includes at least a first sound signal portion and a second sound signal portion according to respective sound signal paths. The sound signal can be received with one or more sound transducers (also referred to herein as sound sensors). At block 16, the one or more sound sensors convert the sound signal to another form of energy, for example to a respective one or more electronic signals, collectively referred to as an electronic signal.

While processing of an electronic signal is described herein, it should be appreciated that the same techniques described below can apply to an optical signal, generated in accordance with the acoustic signal received at block 12.

At block 18, the electronic signal is correlated, to provide a correlation having correlation features. The correlation of block 18 can be either an autocorrelation, in which the electronic signal is correlated with itself, or a cross correlation, in which an electronic signal is cross correlated with another electronic signal. In either case, the correlation can generate correlation features (e.g., peaks), one of which can be identified at block 20, which has correlation feature parameters (e.g., time delay, amplitude, and phase), which can be measured at block 22. Correlation features and parameters are described more fully below in conjunction with FIGS. 10 and 11.

At block 24, a depth of a sound-generating target is assumed. In general, the assumed depth can bounded by known depth capabilities of submarines. For example, in some embodiments, the assumed depth can be bounded between zero and one thousand feet.

At block 26, a propagation path pair can be selected, which could generate the correlation feature identified at block 20 given the assumed depth selected at block 24. As described above, there exist a plurality of discrete propagation paths between a sound source and a sound receiver. At block 26, a pair of the discrete propagation paths can be selected from among the plurality of possible sound paths. For example, a direct path and a surface reflected path can be selected. For another example, a surface reflected path and a bottom reflected path can be selected. In general, the maximum path range can be bounded based on known sound source levels of submarines and a knowledge of ocean acoustics.

Time delay of the identified correlation feature can be an indicator of which propagation paths to select in the propagation path pair, since the time delay of the correlation feature is indicative of a time delay difference of sound traveling on the two propagation paths. Phase of the identified correlation feature can also be an indicator of which propagation paths to select, since it is known that sound bouncing from the ocean surface tends to undergo a phase reversal, while sound bouncing from the ocean bottom, in particular a hard ocean bottom, tends not to undergo a phase reversal.

Though the plurality of potential sound paths is great in number, the propagation path pair is selected from a relative small number of discrete propagation path types. As described above, when sound bounces multiple times from surfaces, it tends to lose intensity and become negligible in a received sound signal.

As described above, through there exist a large number of sound paths between s sound source and a sound receiver, some of the propagation paths will be dominant, i.e., sound received at a sound receiver will have content largely from the dominant sound paths.

Figure 3:
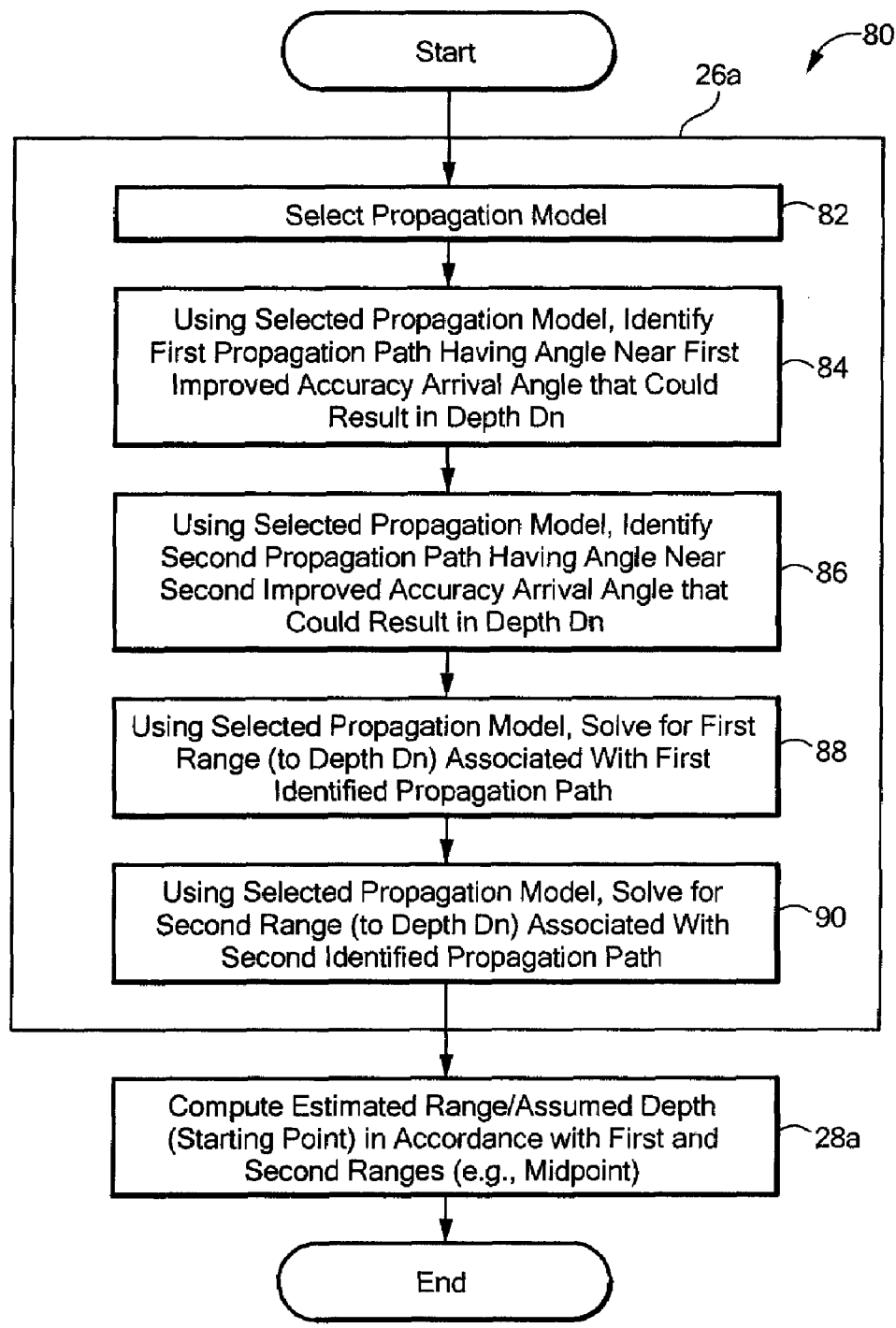
FIG. 3 is a flow chart showing further details of the process of FIG. 1.
Figure 3A:
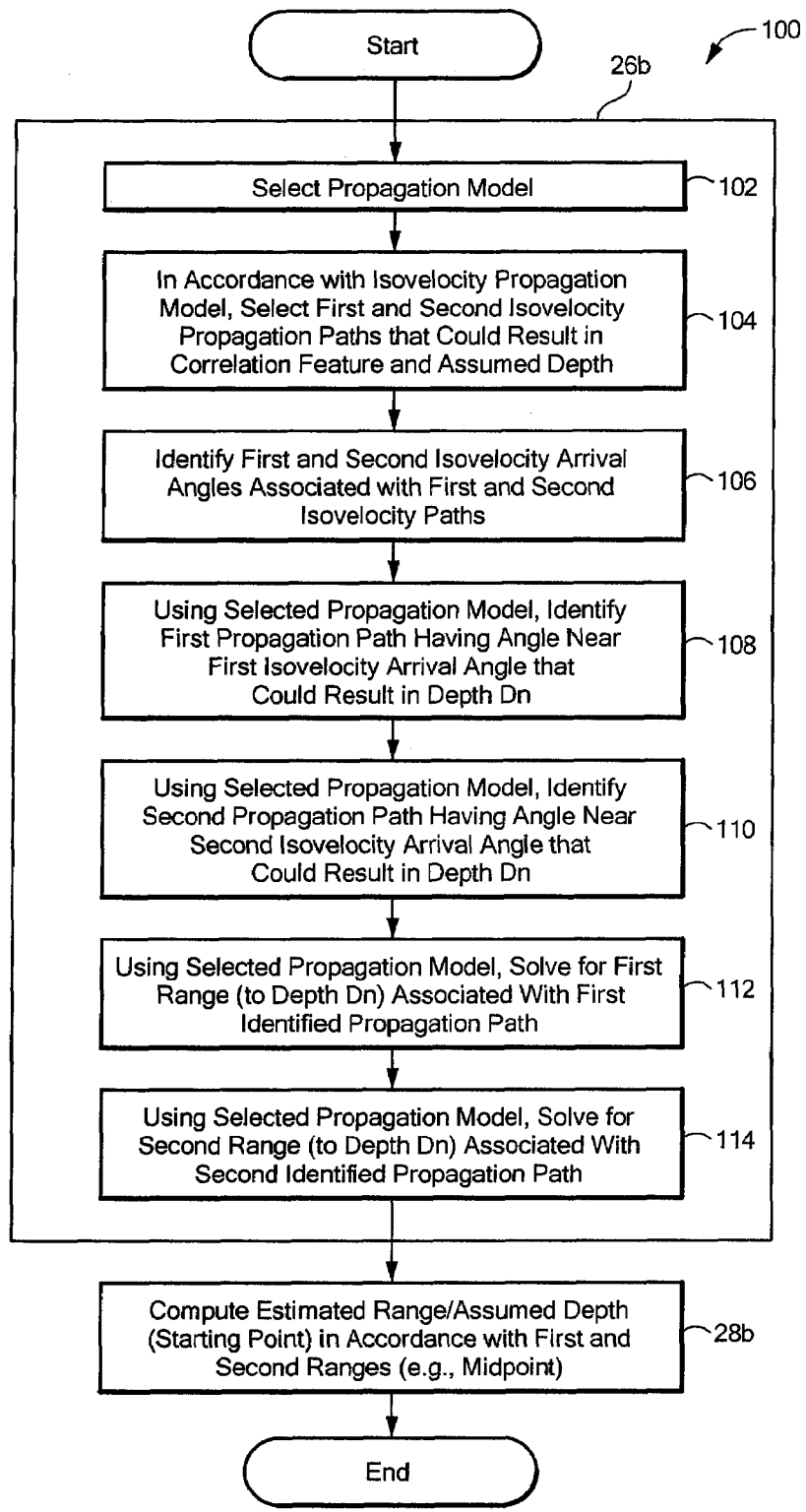
FIGS. 3A and 3B are flow charts showing further details of the process of FIG. 1 alternate to those of FIG. 3.

The selection of the propagation path pair is described more fully below in conjunction with FIGS. 3-3A, in which the selection is made knowing an arrival angle of the sound at the sound receiver (FIG. 3), and in which the selection is made without knowing the arrival angle (FIGS. 3, 3A).

From the selected propagation path pair of block 26, and given the assumed depth of the target at block 24, a range to the target is first estimated at block 28, to provide an estimated range at the assumed depth (estimated range/assumed depth, also referred to herein as a starting point), and then resolved at block 30, to provide a resolved range at the assumed depth (resolved range/assumed depth).

The estimated range/assumed depth is more fully described below in conjunction with FIGS. 3-3B, and the resolved range/assumed depth is more fully described below in conjunction with FIG. 4. Let it suffice here to say that the estimated range/assumed depth provides a starting point, from which the resolved range/assumed depth can be determined. However, the resolved range/assumed depth may not be indicative of a final range and depth (localization) of the target.

To this end, at block 32, a likelihood factor is assigned to the resolved range/assumed depth generated at block 30. The likelihood factor is described more fully below in conjunction with FIG. 4. The likelihood factor is a value, which can be generated in a variety of ways, which is indicative of the quality of the accuracy of the resolved range/assumed depth generated at block 30. Therefore, the resolved range/assumed depth generated at block 30 can be compared with other resolved ranges/assumed depths generated as described below, in order to select a best resolved ranges/assumed depth as indicative of the location of the target in range and depth.

Decision blocks 34-40 are representative of loops that can be performed through the block 18-32 in order to generate further resolved ranges/assumed depths at block 30 and further corresponding likelihood factors at block 32. Decision block 34 can be used to select other propagation path pairs at block 26. Decision block 36 in conjunction with block 44 can be used to select other assumed target depths at block 24. Decision block 38 in conjunction with block 46 can be used to identify another correlation feature at block 20 in the correlation generated at block 18. Decision block 40 can be used to generate further correlations at block 18.

Having completed all of the loops by way of decision blocks 34-40, and therefore, having generated a plurality of resolved ranges/assumed depths and corresponding likelihood factors, at block 42, one resolved range/assumed depth is selected from among the plurality of resolved ranges/assumed depths, by inspecting the corresponding likelihood factors. The one resolved range/assumed depth is referred to herein as a localized range and localized depth (localized range/localized depth). In some embodiments, as further described below in conjunction with FIGS. 13-15, the likelihood factors may be used to compute the localized range/localized depth as a weighted average range and a weighted average depth. The localized range/localized depth represents the best estimate of range and depth to the target and is further described below is conjunction with FIG. 4 and FIGS. 13-15.

Figure 2:
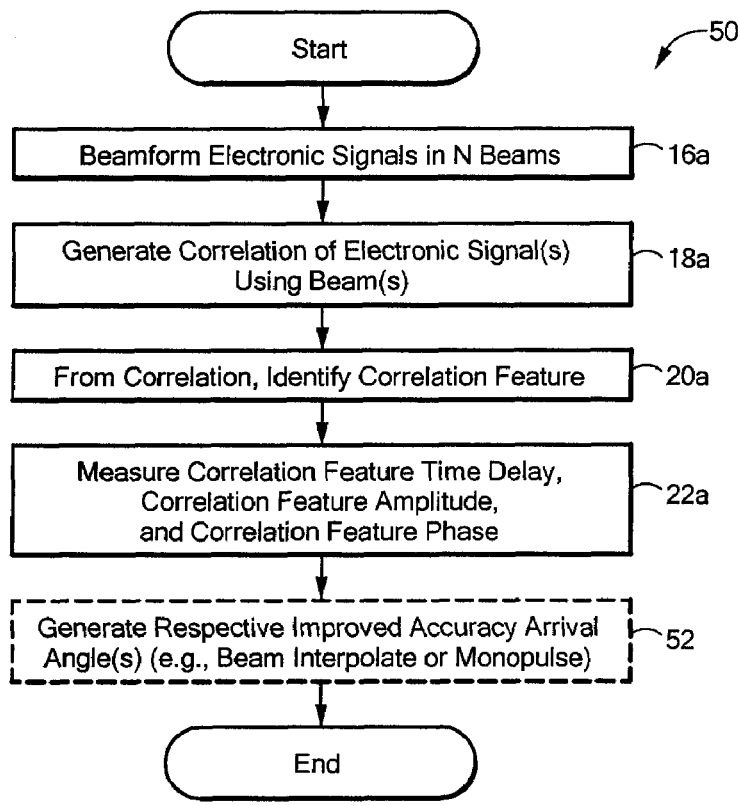
FIG. 2 is a flow chart showing further details of the process of FIG. 1.

Referring now to FIG. 2, in which similar elements of FIG. 1 are shown having similar reference designators, but with an appended character "a," a process 50 shows further details of part of the process 10 of FIG. 1, in particular for a process that includes beamforming of the acoustic signal received at block 12 of FIG. 1.

At block 16*a*, the electronic signals of block 16 of FIG. 1 are beamformed to provide a number, N, of acoustic receive beams. At block 18*a*, the beamformed signal is correlated. For example an electronic signal representative of one acoustic beam can be autocorrelated. For another example, two electronic signals representative of two acoustic beams can be cross correlated.

At block 20*a*, in whatever form of correlation is generated at block 54, a correlation feature is identified in the correlation. At block 22*a*, correlation feature parameter values are measured, for example, a correlation feature time delay value, a correlation feature amplitude value, and/or a correlation feature phase value.

At block 52, optionally, the beamformed signals corresponding to the plurality of acoustic beams generated at block 16*a* can be interpolated in order to generate improved accuracy arrival angles associated with the acoustic signal received at block 12 of FIG. 1. It will be understood that each correlation feature in the correlation generated in block 18*a* is associated with two sound propagation paths, which can arrive at the sound sensors on different angles or at similar angles. Therefore, at block 52, one or two an angles of arrival can be identified.

For example, where an autocorrelation in one beam is generated at block 18*a*, and a resulting correlation feature magnitude is measured, similar autocorrelations can be generated using adjacent beams, and magnitudes of corresponding correlation features comparable to the correlation feature of the first beam (similar time delay) can be combined to provide one improved accuracy arrival angle. This improved accuracy arrival angle can essentially assume that the two sound paths arrive at the same angle.

For another example, where a cross correlation between two beams is generated at block 18*a*, and a resulting correlation feature magnitude is measured, similar cross correlations can be generated using adjacent beams, and magnitudes of corresponding correlation features comparable to the correlation feature of the first beam pair can be combined to provide two improved accuracy arrival angles. These improved accuracy arrival angles can essentially assume that the two sound paths arrive at the different angles.

In some alternate arrangements, the improved accuracy arrival angle(s) is selected instead to be the beam steering angle of the beam(s) used to generate the correlation at block 18*a*.

As described more fully below, in some embodiments, the improved accuracy arrival angles can be used in combination with other factors to generate the likelihood factors in block 32 of FIG. 1.

Figure 2A:
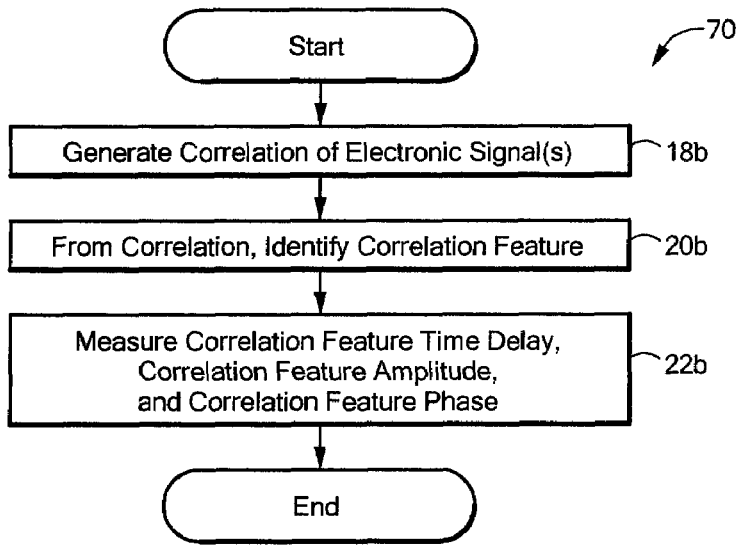
FIG. 2A is a flow chart showing further details of the process of FIG. 1 alternate to those of FIG. 2.

Referring now to FIG. 2A, in which similar elements of FIG. 1 are shown having similar reference designators, but with an appended character "b," a process 70 shows further details for a process that does not include beamforming. At block 18*b*, the electronic signal from block 16 of FIG. 1 is correlated. For example an electronic signal provided by one sound sensor having a single beampattern, for example, an omnidirectional beampattern, can be autocorrelated. For another example, two electronic signals provided by two respective sound sensors, each having a respective single beampattern, for example, respective omnidirectional beampatterns, can be cross correlated.

At block 20*b*, in whatever form of correlation is generated at block 18*b*, a correlation feature is identified in the correlation. At block 22*b*, correlation feature parameters are measured, for example, a correlation feature time delay, a correlation feature amplitude, and/or a correlation feature phase.

Referring now to FIG. 3, in which similar elements of FIG. 1 are shown having similar reference designators, but with an appended character "a," a process 80 shows further details of the blocks 26-28 of FIG. 1, in particular for a process that uses beamforming to achieve the sound arrival angles described in conjunction with of FIG. 2.

At block 82, a propagation model is selected. The selected propagation model can be any form of ray trace model or it can be an isovelocity propagation model. In general, it is advantageous to select a ray trace propagation model rather than an isovelocity propagation model, both of which are described above, since a ray trace model will ultimately yield a more accurate localization of the underwater target in range and in depth.

At block 84, using the selected propagation model, a first propagation path having a first path angle (first simulated arrival angle) is identified that could result in an arrival angle near to the first improve accuracy arrival angle identified at block 52 of FIG. 2 (or, in another embodiment, a beam angle of a beam generated in FIG. 2), and that could result in the depth assumed at block 24 of FIG. 1. At block 86, using the selected propagation model, a second propagation path having a second path angle (second simulated arrival angle) is identified that could result in an arrival angle near to a second improved accuracy arrival angle identified at block 52 of FIG. 2 (or, in another embodiment, a beam angle of a beam generated in FIG. 2), and that could result in the depth assumed at block 24 of FIG. 1.

It should be recognized that, where autocorrelation of a single beam is used in block 18a of FIG. 2, the first and second path angles can be the same angle. This arrangement is described below in conjunction with FIG. 8. However, where cross correlation of two beams is used in block 18a of FIG. 2, the first and second path angles can be different angles. This arrangement is described below in conjunction with FIG. 5.

At block 88, using the selected propagation model and the first identified propagation path, a first range is calculated to the depth assumed at block 24 of FIG. 12. Similarly, at block 90, using the selected propagation model and the second identified propagation path, a second range is calculated to the depth assumed at block 24 of FIG. 12. Therefore, blocks 88 and 90 result in two ranges at the assumed depth.

At block 28a, the two ranges are combined to provide a single "estimated range/assumed depth," which can serve as the starting point for further calculation of range described above in conjunction with block 28 of FIG. 1. In some embodiments, a midpoint between the first and second ranges of blocks 88 and 90 can be computed at block 28a. In other embodiments, one of the first and second ranges can result from the calculation of block 28a. However, other starting ranges can be used, which are related to the first and second ranges of blocks 88 and 90.

Referring now to FIG. 3A, in which similar elements of FIG. 1 are shown having similar reference designators, but with an appended character "b," a process 100 shows further details of the blocks 26-28 of FIG. 1, in particular for a process that does not use beamforming in order to achieve the improved accuracy arrival angles described in conjunction with block 52 of FIG. 2. Essentially, arrival angles of the sound signal portions arriving on different propagation paths within the sound signal received at block 12 of FIG. 1 cannot be directly measured, but are estimated by techniques described below.

At block 102, a propagation model is selected. As described above in conjunction with FIG. 3, the selected propagation model can be any form of ray trace model or it can be an isovelocity propagation model. In general, it is advantageous to select a ray trace propagation model rather than an isovelocity propagation model, both of which are described above, as a ray trace model will ultimately yield a more accurate localization of the underwater target in range and in depth.

At block 104, however, regardless of the propagation model selected at block 102, in accordance with an isolvelocity propagation model, first and second isovelocity (i.e., straight) propagation paths are selected, that could result in the identified correlation feature of block 20 of FIG. 1, having a measured time delay as in block 22 of FIG. 1, and the assumed depth of block 24 of FIG. 1. Using the isovelocity propagation model, the two propagation paths can be computed geometrically, using techniques described below in conjunction with FIG. 6, recognizing that the measured time delay is representative of a time delay difference of the two selected isovelocity propagation paths.

At block 106, from the first and second selected isovelocity propagation paths, first and second isolvelocity arrival angles at sound sensor are computed at block 106. These arrival angles will be recognized to be mere estimates of potential arrival angles according to two isovelocity propagation paths. However, as described above, it is known that sound tends to travel on non-straight propagation paths as it travels in the ocean.

Therefore, at block 108, using the propagation model selected at block 102, which can be a ray trace model, and using the first isovelocity arrival angle, a first propagation path (e.g., non-straight) is identified that has an arrival angle near to the first isovelocity arrival angle. Similarly, at block 110, using the propagation model selected at block 102, and using the second isovelocity arrival angle, a second propagation path (e.g., non-straight) is identified that has an arrival angle near to the second isovelocity arrival angle.

It should be recognized that, though the process of FIG. 3A is associated with a system that does not have beamforming, i.e., has a generally omnidirectional receiving beampattern, the arrival angle of the first and second propagation paths described above in conjunction with blocks 108 and 110, provide similar angle of arrival information as block 52 of FIG. 3 but for a system that does not use beamforming, and therefore, subsequent blocks 112-116 are similar to blocks 88, 90, 28a of FIG. 3.

At block 112, using the selected propagation model and the first identified propagation path, a first range is calculated to the depth assumed at block 24 of FIG. 12. Similarly, at block 114, using the selected propagation model and the second identified propagation path, a second range is calculated to the depth assumed at block 24 of FIG. 12. Therefore, blocks 112 and 114 result in two ranges at the assumed depth.

At block 28b, the two ranges are combined to provide a single "estimated range/assumed depth," which can serve as the starting point for further calculation of range. In some embodiments, a midpoint between the first and second ranges of blocks 112, 114 can be computed at block 116. In other embodiments, one of the first and second ranges can result from the calculation of block 116. However, other starting ranges can be used, which are related to the first and second ranges of blocks 112 and 114.

Figure 3B:
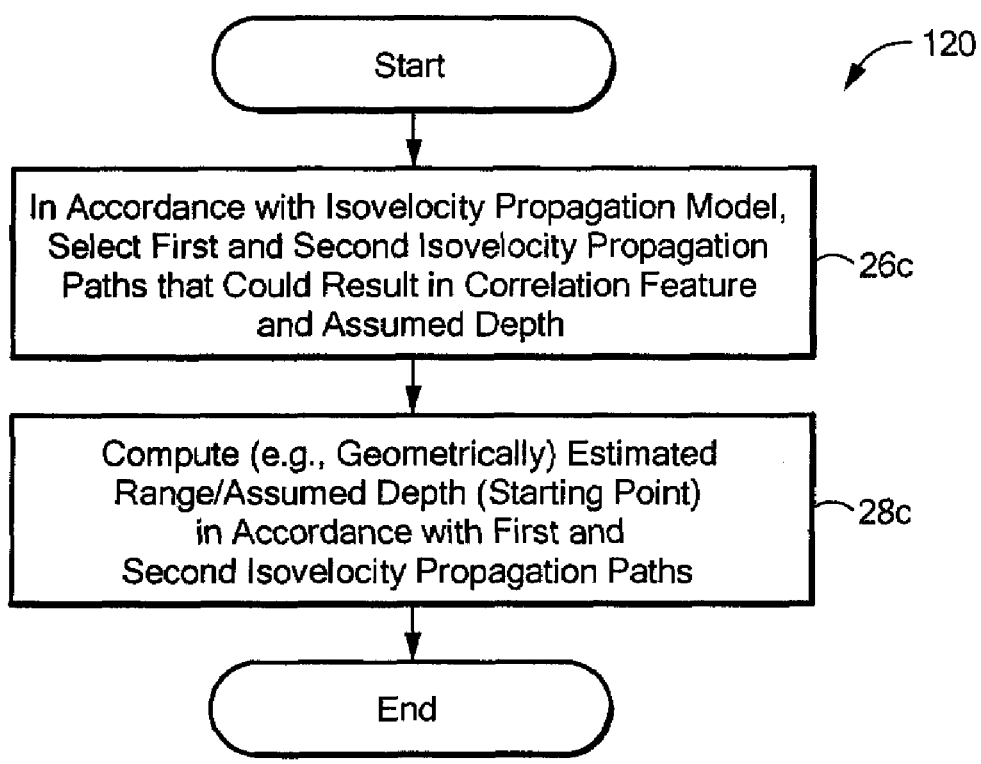

Referring now to FIG. 3B, in which similar elements of FIG. 1 are shown having similar reference designators, but with an appended character "c," a process 120 shows further details of the blocks 26-30 of FIG. 1, alternate to the process 100 of FIG. 3A, in particular for a process that does not use beamforming to achieve the improved accuracy arrival angles described in conjunction with block 52 of FIG. 2. Essentially, arrival angles of the sound signal portions arriving on different propagation paths within the sound signal received at block 12 of FIG. 1 cannot be directly measured, but are estimated. However, unlike the process 100 of FIG. 3A, only an isovelocity propagation model is used.

At block 26c, similar to block 104 of FIG. 3A, in accordance with an isolvelocity propagation model, first and second isovelocity (i.e., straight) propagation paths are selected, that could result in the identified correlation feature of block 20 of FIG. 1, having a measured time delay as in block 22 of FIG. 1, and the assumed depth of block 24 of FIG. 1. As described above, using the isovelocity propagation model, the two propagation paths can be computed geometrically, using techniques described below in conjunction with FIG. 6, recognizing that the measured time delay is representative of a time delay difference of the two selected isovelocity propagation paths.

At block 28c, an estimated range/assumed depth (starting point) is calculated based upon the isovelocity propagation paths. It should be noted that, unlike the process 100 of FIG. 3, the angles of the propagation paths are not used.

Figure 4:
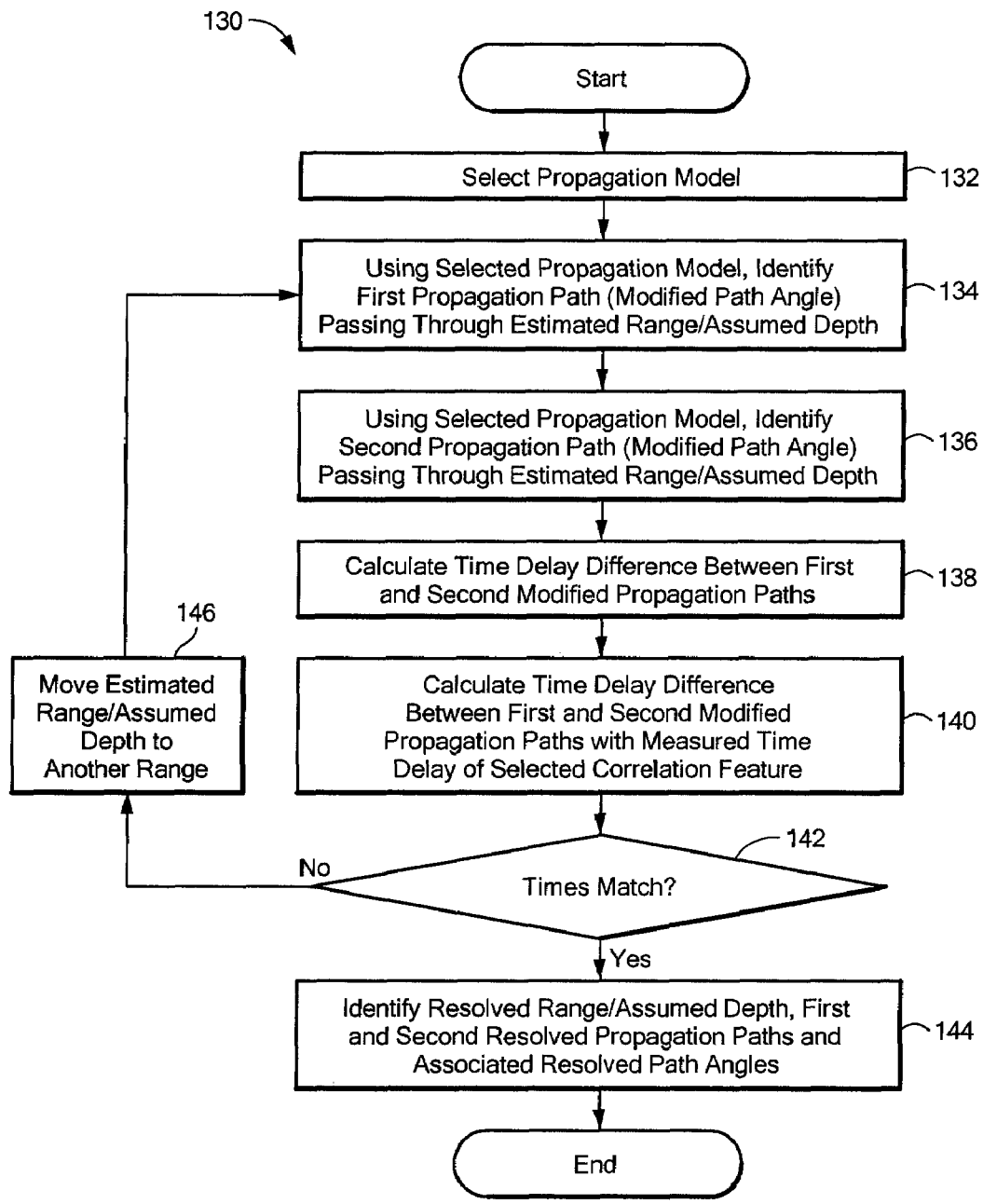
FIG. 4 is a flow chart showing still further details of the process of FIG. 1.

Referring now to FIG. 4, a process 130 can be representative of the process of block 30 of FIG. 1, and can result in a so-called "resolved range" at the assumed target depth (resolved range/assumed depth) of block 24 of FIG. 1. In essence, the resolved range/assumed depth can be more accurate than the estimated range/assumed depth provided at block 28 of FIG. 1, as represented in alternate methods 80, 100, 120 of FIGS. 3-3B, respectively.

The process 130 begins at block 132, where a propagation model is selected. As described above in conjunction with FIG. 3, the selected propagation model can be any form of ray trace model or it can be an isovelocity propagation model. In general, it is advantageous to select a ray trace propagation model rather than an isovelocity propagation model, both of which are described above, as a ray trace model will ultimately yield a more accurate localization of the underwater target in range and in depth. The propagation model selected at block 132 need not be the same propagation model selected at other blocks described above.

At block 134, using the selected propagation model, a first modified propagation path is identified that passes through a point represented by the estimated range/assumed depth described in blocks 28, 28a, 28b, 28c of FIGS. 1, 3, 3A, and 3B, respectively. Similarly, at block 136, using the selected propagation model, a second modified propagation path is identified that passes through a point represented by the estimated range/assumed depth.

At block 138, a time delay difference is calculated between the first and second modified propagation paths. In some embodiments, the time delay difference can be calculated in accordance with the propagation model selected at block 132.

At block 140, the time delay difference calculated at block 138 is compared with the measured time delay associated with the identified correlation feature, which is measured at blocks 22, 22a, 22b of FIGS. 1, 2, and 2A, respectively.

At block 142, if the compared time delays do not match within a predetermined matching threshold, then the process continues to block 146, where the point corresponding to the estimated range/assumed depth is moved to another range, and therefore, to a new estimated range/assumed depth. To this end, the range can be moved to a shorter range or a greater range at the assumed depth selected at box 24 of FIG. 1.

The direction of range movement of the estimated range/assumed depth can be determined in a variety of ways. In some embodiments, the direction is selected to toward greater ranges. In other embodiments, the direction is selected to be toward shorter ranges. In still other embodiments, the direction is selected in accordance with a reduction in the time delay difference resulting from another time delay comparison as in block 140.

The process then repeats at block 134, where the new estimated range/assumed depth is processed, resulting in yet another time delay difference at block 140. The process loops via decision block 142 until, at block 142, the compared time delays do match within the predetermined matching threshold. When this match occurs, at block 144, the estimated range/assumed depth that resulted in the match is deemed to be a resolved range at the assumed depth (resolved range/assumed depth), and the associated first and second propagation paths are deemed to be resolved first and second propagation paths, with respective first and second resolved path angles.

The resolved range/assumed depth is a point in space at which the underwater target may be present. However, by way of the looping process of FIG. 1, a plurality of resolved ranges at a plurality of assumed depths may be generated, for one or a plurality of correlation features resulting from one or a plurality of correlations. Eventually, the process of FIG. 1, at block 42, selects a localized range and a localized depth from the plurality of resolved ranges and corresponding assumed depths.

The selection of the one localized range/localized depth can be performed in a variety of ways. In one particular embodiment, the selection is based upon a likelihood factor of those assigned to the plurality of resolved ranges/assumed depths at block 32 of FIG. 1.

The likelihood factors can be generated in a variety of ways. In one particular embodiment, the likelihood factors are generated by comparing, for each one of the resolved ranges/assumed depths, at least one of a calculated arrival angle of the first resolved propagation path with the first improved accuracy arrival angle measured at block 52 of FIG. 2, or a calculated arrival angle of the second resolved propagation path with the second improved accuracy arrival angle measured at block 52 of FIG. 2. This comparison of arrival angles can be described by equation below.

$$q = e^{\frac{-(\tilde{\theta}_1 - \theta_1)^2}{2\sigma_{\theta_1}^2}} e^{\frac{-(\tilde{\theta}_2 - \theta_2)^2}{2\sigma_{\theta_2}^2}} \quad (1)$$

where: q is a likelihood factor, $\theta$ are the measured improved accuracy arrival angles, $\tilde{\theta}$ (with tilde) are the calculated arrival angles for the resolved range/assumed depth, and $\sigma$ is standard deviation.

In other embodiments, and in particular, in embodiments for which an arrival angle is not measured (i.e., non-beamformed arrangements), other parameters can be used to generate likelihood factors, used to select the localized range and localized depth. For example, in some embodiments, the likelihood factors assigned to each resolved range/assumed depth at block 32 can be representative of a magnitude (or a signal to noise ratio) of the correlation feature identified at block 20 of FIG. 1. In these embodiments, a resolved range/assumed depth having a correlation feature with the best signal to noise ratio can be selected as the localized range/assumed depth.

In still other embodiments, still other parameters can be used to generate likelihood factors, used to select the localized range and localized depth. For example, multiple correlation features can support the generation of a multiplicity of possible range-depth pairs since the path order of arrival is not known a priori. In some embodiments, for each combination of assumed arrival path order, a resolved range/assumed depth is calculated. These ranges can then be used to calculate a mean range and variance. A likelihood factor can be developed, for example, using the inverse of the variance. The resolved range/assumed depth path combination having the highest likelihood factor is selected as the solution for localized range/localized depth; or alternatively, a weighted average can be used.

Referring now to Tables 1 and 2, an example is given that calculates likelihood factors by using the inverse of the variance of range, as described above. In this example, isovelocity (straight) propagation paths are used to generate ranges and depths geometrically according to calculations similar to those shown below in conjunction with FIGS. 6 and 10. However, similar techniques can also be used when non-isovelocity propagation paths are assumed, as shown below in conjunction with FIG. 5.

In Table 1, resolved ranges/assumed depths are shown for a source at 60 yards depth and a range of 2500 yards from a receiver located at a depth of 170 yards. A water depth of 200 yards is assumed. The computed travel times for the direct (D1), surface reflected (S1), and bottom reflected (B1) paths are 1.472, 1.476 and 1.474 seconds respectively. These delays result in a corresponding set of autocorrelation time delays of 2.0, 2.8, and 4.8 ms, respectively.

For this particular example, range and depth solutions are obtained generally using the method of FIG. 1. However, for an isovelocity case, the resolved ranges/assumed depths of block 30 (FIG. 1) are the same as the estimated ranges/assumed depths of block 28 (FIG. 1. Table 1 shows calculated ranges for different path combinations that can be attributed to measured correlation features having the delays of 2.0, 2.8, and 4.8 ms. Notations, for example, D1:S1, are indicative of a correlation feature generated by an autocorrelation, and are representative of a path pair, for example, a direct path and a surface reflected path.

TABLE 1

| MEAS. DELAY | ASSUMED PATHS | ASSUMED DEPTH, yards | | | | | |
|---|---|---|---|---|---|---|---|
| | | 15 | 30 | 45 | 60 | 75 | 90 |
| 2.8 | D1:S1 | 1066 | 2132 | 3198 | 4264 | 5330 | 6396 |
| 2.0 | D1:B1 | 3309 | 3041 | 2772 | 2504 | 2236 | 1968 |
| 4.8 | S1:B1 | 737 | 0 | 737 | 1474 | 2212 | 2949 |
| | mean rng | 1704 | 1724 | 2236 | 2747 | 3259 | 3771 |
| | stdev rng | 1400 | 1561 | 1315 | 1411 | 1793 | 2326 |
| 4.8 | D1:S1 | 627 | 1253 | 1880 | 2506 | 3133 | 3760 |
| 2.0 | D1:B1 | 3309 | 3041 | 2772 | 2504 | 2236 | 1968 |
| 2.8 | S1:B1 | 1254 | 0 | 1254 | 2508 | 3762 | 5016 |
| | mean rng | 1730 | 1431 | 1969 | 2506 | 3044 | 3581 |
| | stdev rng | 1403 | 1528 | 763 | 2 | 767 | 1532 |
| 4.8 | D1:S1 | 627 | 1253 | 1880 | 2506 | 3133 | 3760 |
| 2.8 | D1:B1 | 2320 | 2132 | 1944 | 1756 | 1568 | 1379 |
| 2.0 | S1:B1 | 1789 | 0 | 1789 | 3577 | 5366 | 7155 |
| | mean rng | 1578 | 1128 | 1871 | 2613 | 3356 | 4098 |
| | stdev rng | 866 | 1071 | 78 | 915 | 1909 | 2902 |

Referring now to Table 2, likelihood factors are computed and normalized using the reciprocal of squares of the standard deviations of range (stdev rng) of Table 1. A localized range and localized depth is computed using the likelihood factors. In some embodiments, weighted ranges and likelihood factors can be computed for each of the assumed depths.

TABLE 2

| | ASSUMED DEPTH, yards | | | | | |
|---|---|---|---|---|---|---|
| | 15 | 30 | 45 | 60 | 75 | 90 |
| Wt. Range | 1638 | 1347 | 1873 | 2506 | 3110 | 3713 |
| Likelihood | 0.000 | 0.000 | 0.001 | 0.999 | 0.000 | 0.000 |

The minimum variance (maximum likelihood) solution is a localized range/assumed depth equal to 2506 yards range and 60 feet depth. In some embodiments, a single weighted localized range/assumed depth can be calculated, which, using the above table data, gives the same results. Note that there is a six yard error (0.24% error), which is due to an approximation described below (for most passive sonar applications this error is negligible).

In some embodiments, a resolved range/assumed depth having a largest likelihood factor is selected to be the localized range and localized depth. However, it should e apparent from discussion above, that in some other embodiments, the resolved ranges/assumed depths and the associated likelihood factors can be further processed (i.e., combined, e.g., by a weighted average) to provide the localized range/localized depth. Another example of further processing of the resolved ranges/assumed depths is described below in conjunction with FIGS. 13-15.

Figure 5:
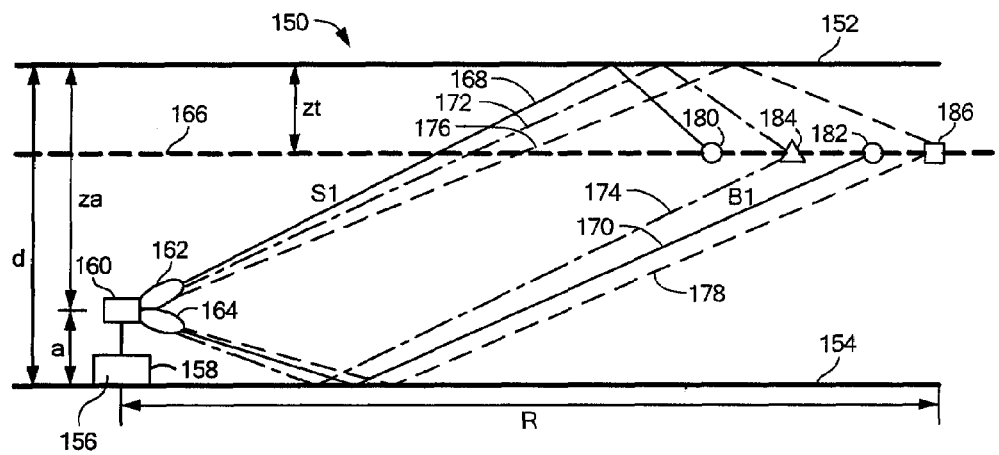
FIG. 5 is a pictorial showing a beamformed arrangement of the present invention having two sound paths, for which a cross correlation is used.

Referring now to FIG. 5, a scenario 150 is representative of the processes described above for systems that use beamforming and cross correlation between signals associated with two different receive beams. A line 152 is representative of a surface of a water basin, for example, a surface of the ocean. A line 154 is representative of a bottom of the water basin. A sonar system 156 is positioned generally at the bottom of the water basin. A dashed line 166 is representative of an assumed target depth in accordance with block 24 of FIG. 1.

The sonar system 156 includes a sound sensor 162 coupled to a processor 158. In some embodiments, the sound sensor 160 includes a single receiving element, for example, cylindrical receiving element, adapted to receive sound and to convert the received sound to an electronic signal. In other embodiments, the sound sensor 160 can include more than one receiving element, each adapted to receive sound and to convert the received sound to a respective electronic signal.

Whether the sound sensor 160 is a single receiving element or more than one receiving element, the sound sensor 160 is capable of being used to form at least two receive beams 162, 164. The receive beams can be pointed toward any vertical angle. Here, the receive beam 162 points upward, in order to receive sound arriving on a surface reflected path, and the receive beam 164 points downward, in order to receive sound arriving one a bottom reflected path.

It should be understood that various propagation paths described below are shown as straight lines in FIG. 5. However, as described above, sound propagating in water tends to propagate on non-straight propagation paths. The propagation paths shown in FIG. 5 are represented by straight lines for clarity, but will be understood to be curved, particularly when calculated by a ray trace propagation model as described below.

A first propagation path 168 corresponds to a surface reflected path selected in accordance with block 84 of FIG. 3. As described above in conjunction with FIG. 3, the first propagation path 168 is selected using a selected propagation model so that an arrival angle of the first propagation path 168 at the sonar system 156 is near to an improved accuracy arrival angle identified, for example, at block 52 of FIG. 2.

A second propagation path 170 corresponds to a bottom reflected path selected in accordance with block 86 of FIG. 3. As described above in conjunction with FIG. 3, the second propagation path 170 is selected using the selected propagation model so that an arrival angle of the second propagation path 170 at the sonar system 156 is near to another improved accuracy arrival angle identified, for example, at block 52 of FIG. 2.

The first and second propagation paths 168, 170, a surface reflected path and a bottom reflected path are those paths that are first selected in accordance with FIG. 3. The first propagation path 168 results in a calculated point 180 corresponding to a first range to the target at the assumed depth 166, in accordance with block 88 of FIG. 3. Similarly, the second propagation path 170 results in a calculated point 182 corresponding to a second range to the target at the assumed depth 166, in accordance with block 90 of FIG. 3.

The first and second points are used to compute a point 184 corresponding to an estimated range/assumed depth in accordance with block 28a of FIG. 3. The point 184 can be selected to be a midpoint in range between the points 180, 182. However, in other embodiments, the point 184 can be selected to be one of the points 180, 182. In still further embodiments, the point 184 can be selected based upon any function of the positions of the points 180, 182. The point 184 corresponds to the above-described "starting point" at block 28a of FIG. 3.

Again using the selected propagation model, and using the point 184, which corresponds to the estimated range/assumed depth calculated at block 28a of FIG. 3, propagation paths 172, 174, which pass though the point 184 can be calculated. Furthermore, a time delay between the propagation paths 172, 174 can be calculated, for example, using the selected propagation model.

Sound arriving in the two beams 162, 164 can be cross correlated by the sonar system 156, resulting in correlation feature having a time delay, an amplitude, and a phase, which can be measured, for example, in blocks 22, 22a of FIGS. 1 and 2. It will be understood that the measured time delay of the correlation feature can correspond to a time delay between an actual (not modeled) surface reflected propagation path and an actual bottom reflected propagation path.

The above described calculated time delay difference between the propagation paths 172, 174 can be compared to the above-described measured time delay associated with the identified correlation feature, which, in this case, is a correlation feature in a cross correlation. If the time delay difference is too large, the point 184 can be moved in range at the assumed depth 166, for example to the right. At each movement, in accordance with block 142 of FIG. 4, the time delay difference is examined to identify if the time delay difference is sufficiently small, i.e., below a time delay difference threshold. Eventually, after one of more movements of the point 184, the point 186 is identified at which the time delay difference is sufficiently small. The point 186 corresponds to the above-described resolved range/assumed depth identified at block 144 of FIG. 4.

The resolved range/assumed depth 186 has a first resolved propagation path 176 with a first resolved path angle (not shown) at the sonar system 156 and a second resolved propagation path 178 having a second resolved path angle (not shown) at the sonar system 156.

It will be appreciated that the point 186 can corresponds to but one of a plurality of resolved ranges/assumed depths identified by the process 10 of FIG. 1. One localized angle/localized depth is selected from among the plurality of resolved ranges/assumed depths by the process described above in conjunction with block 42 of FIG. 1.

Figure 6:
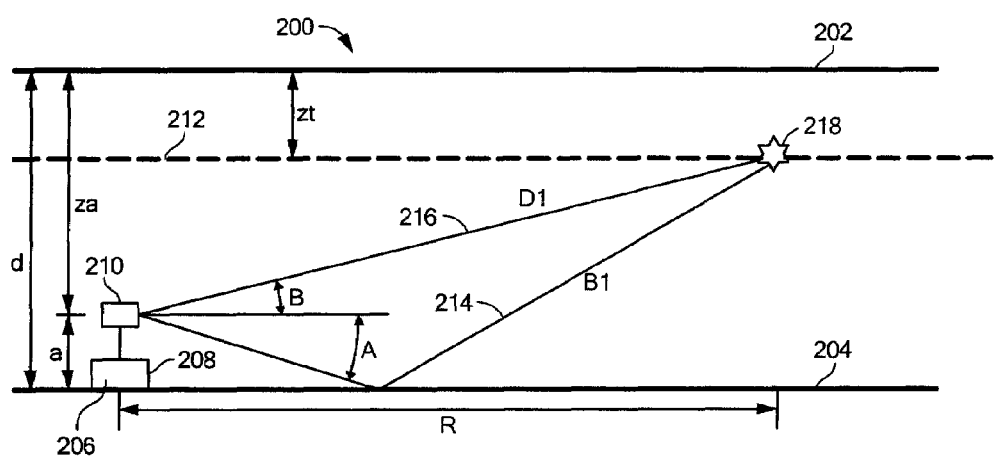
FIG. 6 is a pictorial showing an omnidirectional arrangement of the present invention having two sound paths, for which an autocorrelation is used.
Figure 6A:
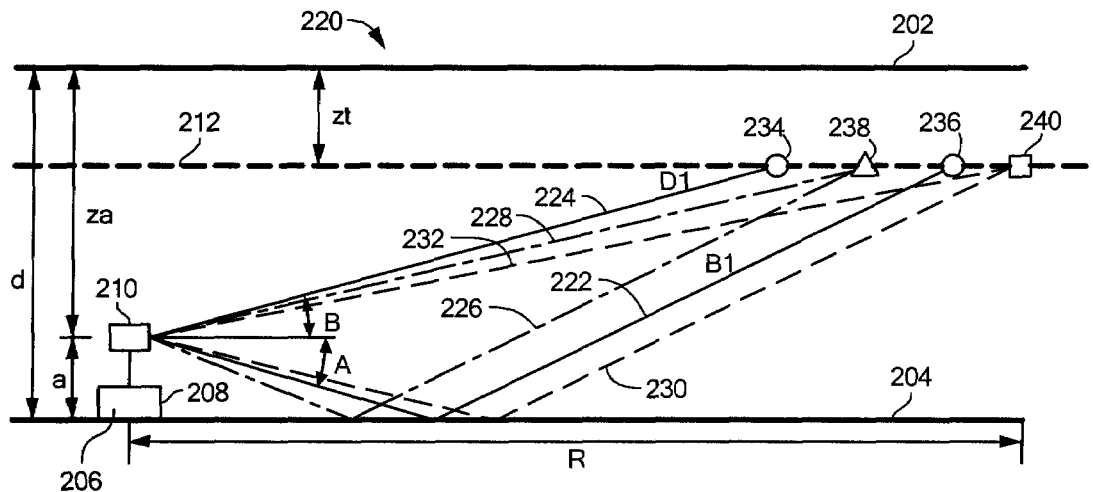
FIG. 6A is a pictorial showing further details of the omnidirectional arrangement of FIG. 6.

Referring now to FIGS. 6 and 6A, scenarios 200, 220 are representative of the processes described above for system that does not use beamforming and that uses autocorrelation of a signal associated with an unidirectional receive beam. As described below, the autocorrelation can result in a correlation feature having a measured time delay associated, for example, with a direct propagation path and a bottom reflected propagation path, which propagation paths are described more fully below.

Referring first to FIG. 6, a line 202 is representative of a surface of a water basin, for example, a surface of the ocean. A line 204 is representative of a bottom of the water basin. A sonar system 206 is positioned generally at the bottom of the water basin. A dashed line 212 is representative of an assumed target depth in accordance with block 24 of FIG. 1.

The sonar system 206 includes a sound sensor 210 coupled to a processor 208. In some embodiments, the sound sensor 210 includes a single receiving element, for example, cylindrical receiving element, adapted to receive sound and to convert the received sound to an electronic signal. In other embodiments, the sound sensor 210 can include more than one receiving element, each adapted to receive sound and to convert the received sound to a respective electronic signal.

Whether the sound sensor 210 is a single receiving element or more than one receiving element, the sound sensor 210 provides a substantially unidirectional receiving beampattern.

It should be understood that various propagation paths described below are shown as straight lines in FIGS. 6 and 6A. Propagation paths shown in FIG. 6 are intended to be associated with an isovelocity propagation model, and therefore, are, in fact, assumed to be straight. However, propagation paths shown in FIG. 6A are represented by straight lines for clarity, but will be understood to be curved, particularly when calculated by a ray trace propagation model as described below.

A first propagation path 214 corresponds to an isovelocity bottom reflected propagation path. A second propagation path 216 corresponds to an isovelocity direct propagation path. The first and second isovelocity propagation paths 214, 216 correspond to the first and second isovelocity propagation paths selected above in conjunction with block 104 of FIG. 3A.

The first and second isovelocity propagation paths 214, 216 intersect at a point 218 at the assumed depth 212 (depth zt), resulting in arrival angles labeled A and B. The arrival angles labeled A and B correspond to the first and second isovelocity arrival angles identified above in conjunction with block 106 of FIG. 3A.

The first and second isovelocity propagation paths 214, 218, the point 218, and the angles labeled A and B can be computed geometrically, for example, by equations below.

$$\text{Direct Path } (D1): SR(D1)^2 = (za-zt)^2 + R^2; \text{ and} \quad (2)$$

$$\text{Bottom Reflected Path } (B1): SR(B1)^2 = (za-zt+2a) + R^2, \quad (3)$$

Where: SR=slant range, and a=d−za and is the height of the sound sensor (e.g., the sound sensor 210 of FIG. 6) above the bottom. For convenience, let h=za−zt. Expanding the above equations and then taking the difference yields:

$$SR(B1)^2 - SR(D1)^2 = 4ha + 4a^2 \quad (4)$$

Next, the above expression can be factored into:

$$(SR(B1)-SR(D1))(SR(B1)+SR(D1)) = 4a(h+a) \quad (5)$$

Now, SR(B1)-SR(D1) is c (the average sound speed) times the time delay tau ($\tau$) (also denoted as TSR(B1)) associated with an identified autocorrelation feature. The quantity, a, is known.

The above equations for SR(D1) and SR(B1) can be rewritten in terms of h and a.

$$\text{Direct Path } (D1): SR(D1)$$
$$\sqrt{h^2+R^2} \approx R(1+h^2/2R^2), h^2/R^2 \ll 1 \quad (6)$$

$$\text{Bottom Reflected Path } (B1): SR(B1) =$$
$$\sqrt{(h+2a)^2+R^2} \approx R[1+(h+2a)^2/2R^2] \quad (7)$$

Often of most interest is a solution for a near-bottom sonar system (e.g. the sonar system 206 of FIG. 6) and for a near-surface target. Therefore, both $h^2+R^2$ and $(h+2a)^2+R^2$ can be approximated by $R^2+d^2$. Then:

$$SR(D1)+SR(B1) \approx 2\sqrt{R^2+d^2} \approx 2(R+d^2/2R^2) \quad (8)$$

This results in an approximate relationship between range, R, and the depth, zt:

$$2(R+d^2/2R^2)c\tau = 4a(a+h) \quad (9)$$

The above expression may be solved as a quadratic. However, the above expression can be further simplified by ignoring the factor, d, when $d^2/R^2 \ll 1$ (e.g., shallow water). This leads to the approximate relationship between the range, R, and the depth, zt:

$$R \approx 2a(h+a)/c\tau \qquad (10)$$

A slightly more convenient form of the above result is obtained by noting that h+a=za−zt+a=d−zt; and therefore, the approximate relationship between the range, R, and the depth, zt, becomes:

$$R \approx 2a(d-zt)/c\tau \qquad (11)$$

It should be recognized that a computed range, R, identifies the point 218 at the assumed depth 212. Having the range, R, it will be recognized that the angles labeled A and B can be computed geometrically. The geometrically computed angels are described above in conjunction with block 106 of FIG. 3A.

While a geometric calculation involving the bottom reflected path 214 and the direct path 216 is shown above, it will be recognized that similar calculations using other combinations of isovelocity sound paths can yield an isovelocity range and other isovelocity propagation path angles. For example, a surface reflected path and the direct path 216 can be used.

The isovelocity propagation path angles labeled A and B can be used in further estimations described below in conjunction with FIG. 6, in order to find a subsequent starting point, also referred to above as an estimated range/ assumed depth, which is associated with the assumed depth 212. However, in accordance with the process described above in FIG. 3B, in some embodiments, the range and assumed depth represented directly by the point 218 can serve as the starting point.

Referring now to FIG. 6A, in which like elements of FIG. 6 are shown having like reference designations, a scenario 220 shows how the angles labeled A and B in FIG. 6 can be used to identify a starting point, i.e., an estimated range/ assumed depth, represented by block 28b of FIG. 3A, and how the starting point can be used to identify a resolved range, represented by block 144 for FIG. 4.

A bottom reflected path 222 (first path) and a direct propagation path 224 (second path) are generated using a selected propagation model, for example a ray trace propagation model, using the arrival angles labeled A and B, which were identified from isovelocity propagation paths 214, 216 of FIG. 6. As described above, while the propagation paths 222, 224 are represented by straight lines, it will be recognized that the propagation paths using the selected propagation model need not be straight.

The bottom reflected path 222 results in a point 236 at the assumed depth 212. The direct path 224 results in a point 234 at the assumed depth 212. The two points 234, 236 (ranges) can first be combined in order to find a starting point 238, i.e., an estimated range/assumed depth. The estimated range/assumed depth is described above, for example, in conjunction with block 28 of FIG. 1, block 28a of FIG. 3, block 28b of FIG. 3A, and block 28c or FIG. 3B.

In one particular embodiment, the starting point 238 is selected to be at the midpoint in range between the points 234, 236. In another embodiments, the point 234 is selected to be the starting point. In another embodiment, the point 236 is selected to be the starting point. In another embodiment, the starting point 238 is calculated as another combination of the points 234, 236.

The starting point 238 can be used in conjunction with the selected propagation model, selected, for example at block 132 of FIG. 4, in order to identify a first modified propagation path 226 and a second modified propagation path 228, which both pass through the estimated range/assumed depth starting point 238, as described, for example, in conjunction with blocks 134, 136 of FIG. 4. In accordance with block 138 of FIG. 4, a time delay difference of the first and second modified propagation paths 226, 228 can be computed. In accordance with block 140 of FIG. 4, the time delay difference can be compared with a time delay of an identified correlation feature, which in this case, is a correlation feature in an autocorrelation.

Sound arriving at the sound sensor 210 can be autocorrelated by the sonar system 206, resulting in a correlation feature having a time delay, and amplitude, and a phase, which can be measured, for example, in block 22 of FIG. 1 and block 22b of FIG. 2A. It will be understood that the measured time delay of the correlation feature can correspond to a time delay between an actual (not modeled) bottom reflected propagation path and an actual direct propagation path.

The above described calculated time delay difference between the propagation paths 226, 228 can be compared to the above-described measured time delay associated with the identified correlation feature. If the time delay difference is too large, the point 238 can be moved in range at the assumed depth 212, for example to the right. At each movement, in accordance with block 142 of FIG. 4, the time delay difference is examined to identify if the time delay difference is sufficiently small, i.e., below a time delay difference threshold. Eventually, after one of more movements of the point 238, a point 240 is identified at which the time delay difference is sufficiently small. The point 240 corresponds to the above-described resolved range/assumed depth identified at block 144 of FIG. 4.

The resolved range/assumed depth 240 has a first resolved propagation path 230 with a first resolved path angle (not labeled) at the sonar system 206 and a second resolved propagation path 232 having a second resolved path angle (not labeled) at the sonar system 206.

It will be appreciated that the point 240 can corresponds to but one of a plurality of resolved ranges/assumed depths identified by the process 10 of FIG. 1. One localized angle/localized depth is selected from among the plurality of resolved ranges/assumed depths as described above in conjunction with FIG. 4.

Figure 7:
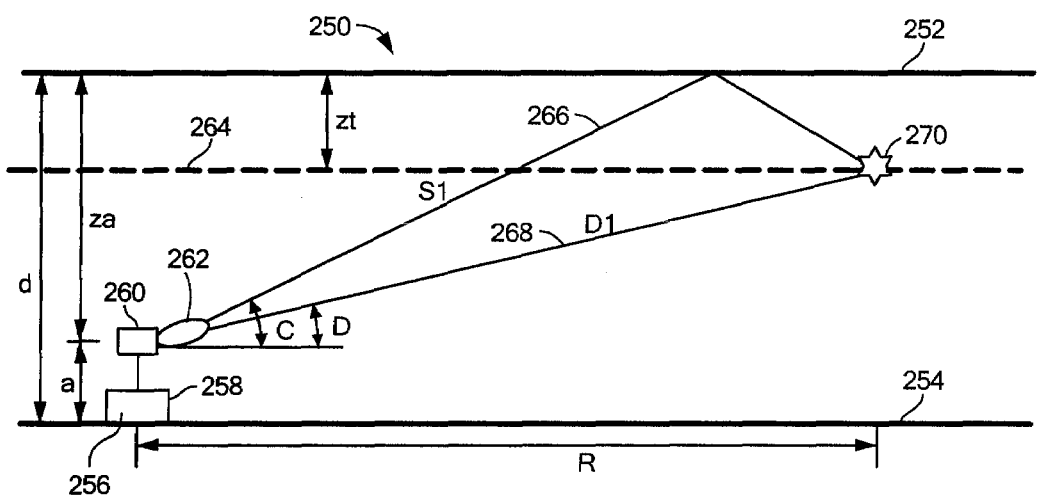
FIG. 7 is a pictorial showing another beamformed arrangement of the present invention having two sound paths, for which an autocorrelation is used.
Figure 7A:
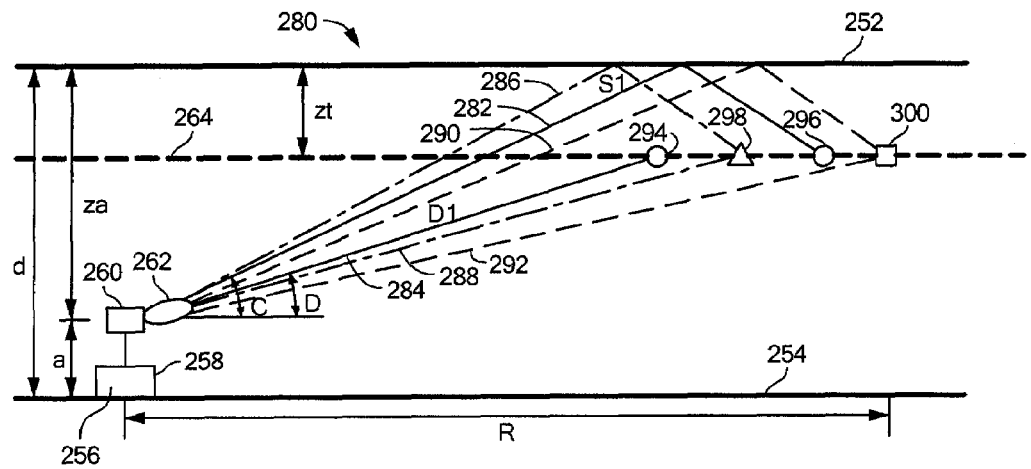
FIG. 7A is a pictorial showing further details of the beamformed arrangement of FIG. 6.

Referring now to FIGS. 7 and 7A, scenarios 250, 280 are representative of the processes described above for system that does uses beamforming and that uses autocorrelation of a signal associated with a directional receive beam. As described below, the autocorrelation can result in a correlation feature having a measured time delay associated, for example, with a direct propagation path and a surface reflected propagation path, which propagation paths are described more fully below.

Referring first to FIG. 7, a line 252 is representative of a surface of a water basin, for example, a surface of the ocean. A line 254 is representative of a bottom of the water basin. A sonar system 256 is positioned generally at the bottom of the water basin. A dashed line 264 is representative of an assumed target depth in accordance with block 24 of FIG. 1.

The sonar system 256 includes a sound sensor 260 coupled to a processor 258. In some embodiments, the sound sensor 260 includes a single receiving element, for example, cylindrical receiving element, adapted to receive sound and to convert the received sound to an electronic signal. In other embodiments, the sound sensor 260 can include more than one receiving element, each adapted to receive sound and to convert the received sound to a respective electronic signal.

Whether the sound sensor 260 is a single receiving element or more than one receiving element, the sound sensor 260 is capable of being used to form at least one receive beam 262. The receive beam 262 can be pointed toward any vertical angle. Here, the beam 262 points upward, in order to receive sound arriving on a surface reflected path and on a direct path. While the beam 262 is shown, processing describe below is similar to the scenarios of FIGS. 6 and 6A, and the beam 262 is not used for angle of arrival information.

It should be understood that various propagation paths described below are shown as straight lines in FIGS. 7 and 7A. Propagation paths shown in FIG. 7 are intended to be associated with an isovelocity propagation model, and therefore, are, in fact, assumed to be straight. However, propagation paths shown in FIG. 7A are represented by straight lines for clarity, but will be understood to be curved, particularly when calculated by a ray trace propagation model as described below.

A first propagation path 266 corresponds to an isovelocity surface reflected propagation path. A second propagation path 268 corresponds to an isovelocity direct propagation path. The first and second isovelocity propagation paths 266, 268 correspond to the first and second isovelocity propagation paths selected above in conjunction with block 104 of FIG. 3A.

The first and second isovelocity propagation paths 266, 268 intersect at a point 270 at the assumed depth 264 (depth zt), resulting in arrival angles labeled C and D. The arrival angles labeled C and D correspond to the first and second isovelocity arrival angles identified above in conjunction with FIG. 3A.

The first and second isovelocity propagation paths 266, 270, the point 270, and the angles labeled C and D can be computed geometrically, for example, by equations similar to those described above in conjunction with FIG. 6.

It should be recognized that a computed range, R, identifies the point 270 at the assumed depth 264. Having the range, R, it will be recognized that the angles labeled C and D can be computed geometrically. The geometrically computed angels are described above in conjunction with block 106 of FIG. 3A.

While a geometric calculation involving the surface reflected path 266 and the direct path 268 is shown above, it will be recognized that similar calculations using other combinations of isovelocity sound paths can yield an isovelocity range and other isovelocity propagation path angles. For example, a bottom reflected path and the direct path 268 can be used.

The isovelocity propagation path angles labeled C and D can be used in further estimations described below in conjunction with FIG. 7A, in order to find a subsequent starting point, also referred to above as an estimated range/assumed depth, which is associated with the assumed depth 264. However, in accordance with the process described above in FIG. 3B, in some embodiments, the estimated range and assumed depth, represented directly by the point 270, can serve as the starting point.

Referring now to FIG. 7A, in which like elements of FIG. 7 are shown having like reference designations, a scenario 280 shows how the angles labeled C and D in FIG. 6 can be used to identify a starting point, i.e., an estimated range/assumed depth, represented by block 28a of FIG. 3, and how the starting point can be used to identify a resolved range, represented by block 144 for FIG. 4.

A surface reflected path 282 (first path) and a direct propagation path 284 (second path) are generated using a selected propagation model, for example a ray trace propagation model, using the arrival angles labeled C and D, which were identified from isovelocity propagation paths 266, 268 of FIG. 7. As described above, while the propagation paths 282, 284 are represented by straight lines, it will be recognized that the propagation paths using the selected propagation model need not be straight.

The surface reflected path 282 results in a point 296 at the assumed depth 264. The direct path 284 results in a point 294 at the assumed depth 264. The two points 294, 296 (ranges) can first be combined in order to find a starting point 298, i.e., an estimated range/assumed depth. The estimated range/assumed depth is described above, for example, in conjunction with block 28 of FIG. 1, block 28a of FIG. 3, block 28b of FIG. 3A, and block 28c of FIG. 3B.

In one particular embodiment, the starting point 298 is selected to be at the midpoint in range between the points 294, 296. In another embodiments, the point 294 is selected to be the starting point. In another embodiment, the point 296 is selected to be the starting point. In another embodiment, the starting point 298 is calculated as another combination of the points 294, 296.

The starting point 298 can be used in conjunction with the selected propagation model, selected, for example at block 132 of FIG. 4, in order to identify a first modified propagation path 286 and a second modified propagation path 288, which both pass through the estimated range/assumed depth starting point 298, as described, for example, in conjunction with blocks 134, 136 of FIG. 4. In accordance with block 138 of FIG. 4, a time delay difference of the first and second modified propagation paths 286, 288 can be computed. In accordance with block 140 of FIG. 4, the time delay difference can be compared with a time delay of an identified correlation feature, which in this case, is a correlation feature in an autocorrelation.

Sound arriving at the sound sensor 260 can be autocorrelated by the sonar system 206, resulting in a correlation feature having a time delay, and amplitude, and a phase, which can be measured, for example, in block 22 of FIG. 1 and block 22b of FIG. 2A. It will be understood that the measured time delay of the correlation feature can correspond to a time delay between an actual (not modeled) surface reflected propagation path and an actual direct propagation path.

The above described calculated time delay difference between the propagation paths 226, 228 can be compared to the above-described measured time delay associated with the identified correlation feature. If the time delay difference is too large, the point 298 can be moved in range at the assumed depth 264, for example to the right. At each movement, in accordance with block 142 of FIG. 4, the time delay difference is examined to identify if the time delay difference is sufficiently small, i.e., below a time delay difference threshold. Eventually, after one of more movements of the point 298, a point 300 is identified at which the time delay difference is sufficiently small. The point 300 corresponds to the above-described resolved range/assumed depth identified at block 144 of FIG. 4.

The resolved range/assumed depth 300 has a first resolved propagation path 290 having a first resolved path angle (not labeled) at the sonar system 256 and a second resolved propagation path 292 having a second resolved path angle (not labeled) at the sonar system 256.

It will be appreciated that the point 300 can corresponds to but one of a plurality of resolved ranges/assumed depths identified by the process 10 of FIG. 1. One localized angle/localized depth is selected from among the plurality of resolved ranges/assumed depths as described above in conjunction with FIG. 4.

Figure 8:
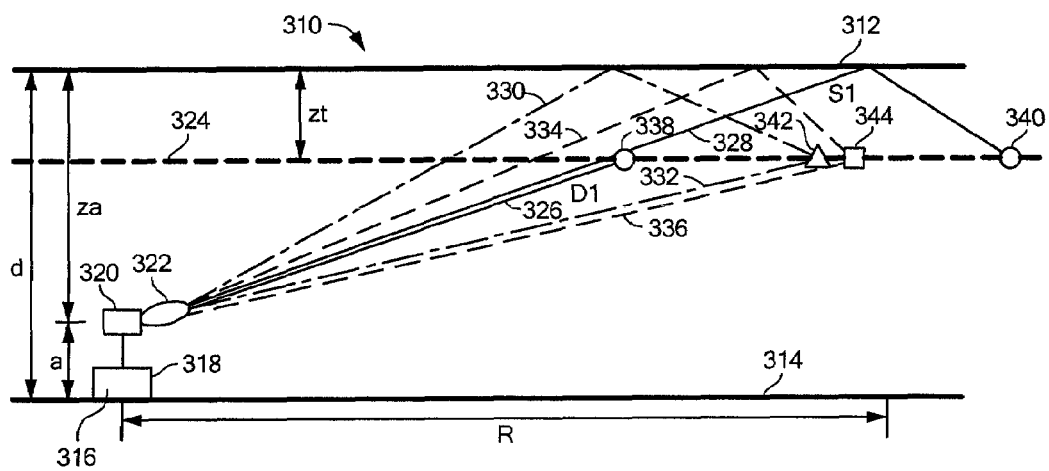
FIG. 8 is a pictorial showing another beamformed arrangement of the present invention having two sound paths, for which an autocorrelation is used.

Referring now to FIG. 8, another scenario 310 is similar to that of FIGS. 7 and 7A, except in the description that follows no isovelocity propagation paths will be identified as they were in FIG. 7. The scenario 310 is representative of the processes described above for systems that use beamforming and autocorrelation correlation of a signal received in one acoustic beam.

A line 312 is representative of a surface of a water basin, for example, a surface of the ocean. A line 314 is representative of a bottom of the water basin. A sonar system 316 is positioned generally at the bottom of the water basin. A dashed line 324 is representative of an assumed target depth in accordance with block 24 of FIG. 1.

The sonar system 316 includes a sound sensor 320 coupled to a processor 318. In some embodiments, the sound sensor 320 includes a single receiving element, for example, cylindrical receiving element, adapted to receive sound and to convert the received sound to an electronic signal. In other embodiments, the sound sensor 320 can include more than one receiving element, each adapted to receive sound and to convert the received sound to a respective electronic signal.

Whether the sound sensor 320 is a single receiving element or more than one receiving element, the sound sensor 320 is capable of being used to form at least one receive beam 322. The receive beam 322 can be pointed toward any vertical angle. Here, the beam 322 points upward, in order to receive sound arriving on a surface reflected path, and on a direct path.

It should be understood that various propagation paths described below are shown as straight lines in FIG. 8. However, the propagation paths shown in FIG. 8 are represented by straight lines for clarity, but will be understood to be curved, particularly when calculated by a ray trace propagation model as described below.

A first propagation path 328 corresponds to a surface reflected path selected in accordance with block 84 of FIG. 3. As described above in conjunction with FIG. 3, the first propagation path 328 is selected using a selected propagation model so that an arrival angle of the first propagation path 328 at the sonar system 316 is near to an improved accuracy arrival angle identified, for example, at block 52 of FIG. 2.

A second propagation path 326 corresponds to a bottom reflected path selected in accordance with block 86 of FIG. 3. As described above in conjunction with FIG. 3, the second propagation path 326 is selected using the selected propagation model so that an arrival angle of the second propagation path 326 at the sonar system 316 is near to an improved accuracy arrival angle identified, for example, at block 52 of FIG. 2, which is the same angle as that provided by the first propagation path 328.

The first and second propagation paths 328, 326, a surface reflected path and a direct path, respectively, are those paths that are first selected in accordance with FIG. 3. The first propagation path 328 results in a calculated point 340 corresponding to a first range to the target at the assumed depth 324, in accordance with block 88 of FIG. 3. Similarly, the second propagation path 326 results in a calculated point 338 corresponding to a second range to the target at the assumed depth 324, in accordance with block 90 of FIG. 3.

The first and second points 340, 338 are used to compute a point 342 corresponding to an estimated range/assumed depth in accordance with block 28a of FIG. 3. The point 342 can be selected to be a midpoint in range between the points 338, 340. However, in other embodiments, the point 342 can be selected to be one of the points 338, 340. In still further embodiments, the point 342 can be selected based upon any function of the positions of the points 338, 340. The point 342 corresponds to the "starting point" described above at block 28a of FIG. 3.

Again using the selected propagation model, and using the point 342, which corresponds to the estimated range/assumed depth calculated at block 28a of FIG. 3, propagation paths 330, 332, which pass though the point 342 can be calculated. Furthermore, a time delay between the propagation paths 330, 332 can be calculated, for example, using the selected propagation model.

Sound arriving in the beam 322 can be autocorrelated by the sonar system 316, resulting in a correlation feature having a time delay, an amplitude, and a phase, which can be measured, for example, in block 22a of FIG. 2. It will be understood that the measured time delay of the correlation feature can correspond to a time delay between an actual (not modeled) surface reflected propagation path and an actual bottom reflected propagation path.

The above described calculated time delay difference between the propagation paths 330, 332 can be compared to the above-described measured time delay associated with the identified correlation feature, which, in this case, is a correlation feature in an autocorrelation. If the time delay difference is too large, the point 342 can be moved in range at the assumed depth 324, for example to the right. At each movement, in accordance with block 142 of FIG. 4, the time delay difference is examined to identify if the time delay difference is sufficiently small, i.e., below a time delay difference threshold. Eventually, after one of more movements of the point 342, the point 344 is identified at which the time delay difference is sufficiently small. The point 344 corresponds to the above-described resolved range/assumed depth identified at block 144 of FIG. 4.

The resolved range/assumed depth 344 has a first resolved propagation path 334 having a first resolved path angle at the sonar system 316 and a second resolved propagation path 336 having a second resolved path angle at the sonar system 316.

It will be appreciated that the point 344 can corresponds to but one of a plurality of resolved ranges/assumed depths identified by the process 10 of FIG. 1. One localized angle/localized depth is selected from among the plurality of resolved ranges/assumed depths by the process described above in conjunction with FIG. 4.

Figure 9:
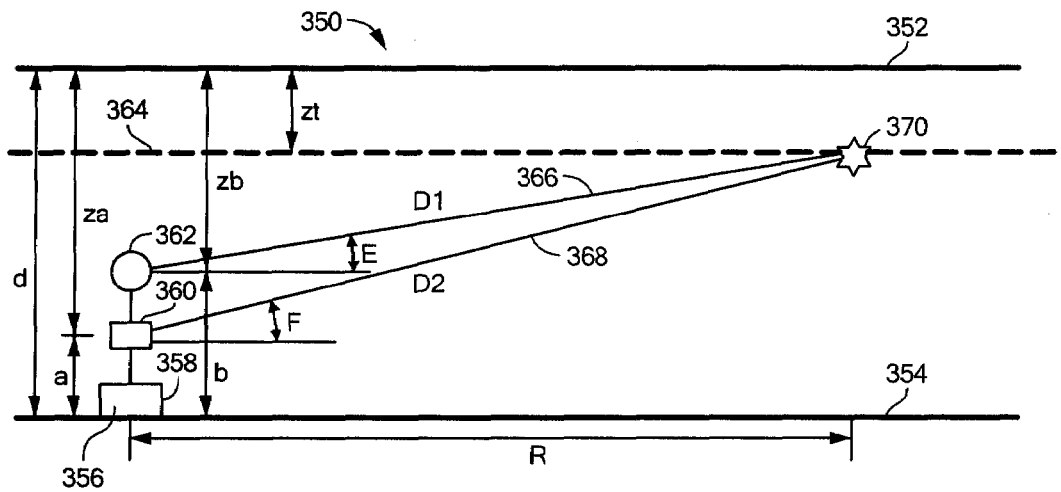
FIG. 9 is a pictorial showing an omnidirectional arrangement of the present invention having two sound paths, for which a cross correlation is used.
Figure 9A:
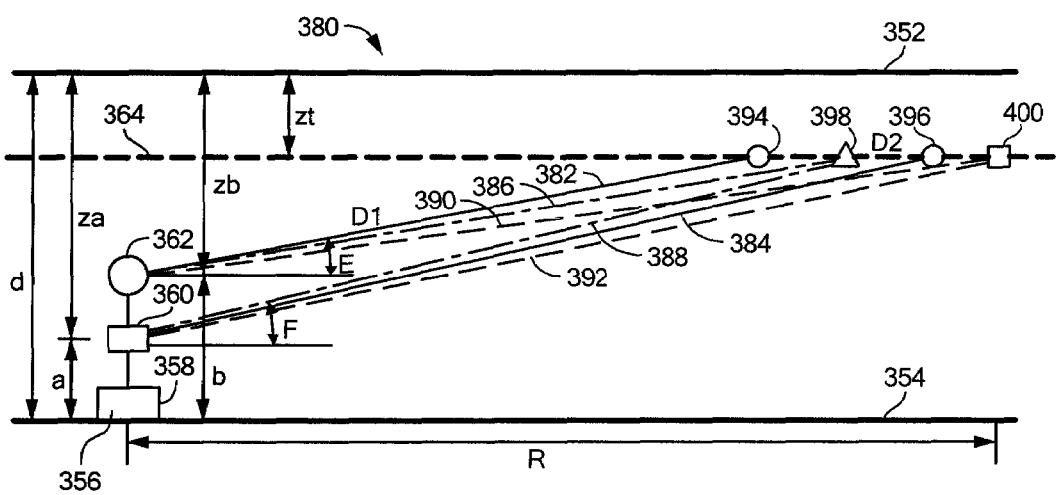
FIG. 9A is a pictorial showing further details of the omnidirectional arrangement of FIG. 9.

Referring now to FIGS. 9 and 9A, scenarios 350, 380 are representative of the processes described above for a system that does not use beamforming and that uses cross correlation of signals associated with two separate omnidirectional receive beams (not shown). The cross correlation can result in a correlation feature having a measured time delay associated, for example, with a first direct propagation path and a second direct propagation path, which propagation paths are described more fully below.

Referring first to FIG. 9, a line 352 is representative of a surface of a water basin, for example, a surface of the ocean. A line 354 is representative of a bottom of the water basin. A sonar system 356 is positioned generally at the bottom of the water basin. A dashed line 364 is representative of an assumed target depth in accordance with block 24 of FIG. 1.

The sonar system 356 includes a first sound sensor 360 and a second sound sensor 362, each coupled to a processor 358. In some embodiments, the sound sensors 360, 362 each include a single receiving element, for example, cylindrical receiving element, adapted to receive sound and to convert the received sound to a respective electronic signal.

The sound sensors 360, 362 are each capable of receiving sound omnidirectionally, i.e., with respective unidirectional or nearly omnidirectional receive beams (not shown). The sound sensors 360, 362 can each receive sound arriving on any propagation path to the sound sensors 360, 362, including, but not limited to, a surface reflected path, a bottom reflected path, and a direct path.

It should be understood that various propagation paths described below are shown as straight lines in FIGS. 9 and 9A. Propagation paths shown in FIG. 9 are intended to be associated with an isovelocity propagation model, and therefore, are, in fact, assumed to be straight. However, propagation paths shown in FIG. 9A are represented by straight lines for clarity, but will be understood to be curved, particularly when calculated by a ray trace propagation model as described below.

A first propagation path 366 corresponds to a first isovelocity direct propagation path. A second propagation path 368 corresponds to a second isovelocity direct propagation path. The first and second isovelocity propagation paths 366, 368 correspond to the first and second isovelocity propagation paths selected above in conjunction with block 104 of FIG. 3A.

The first and second isovelocity propagation paths 366, 368 intersect at a point 370 at the assumed depth 364 (depth zt), resulting in arrival angles labeled E and F. The arrival angles labeled E and F correspond to the first and second isovelocity arrival angles identified above in conjunction with FIG. 3.

The first and second isovelocity propagation paths 366, 368, the point 370, and the angles labeled E and F can be computed geometrically, using techniques similar to those described above in conjunction with FIG. 6.

It should be recognized that the computed range, R, identifies the point 370 at the assumed depth 364. Having the range, R, it will be recognized that the angles labeled E and F can be computed geometrically. The geometrically computed angels are described above in conjunction with block 106 of FIG. 3A.

While a geometric calculation involving the direct paths 366, 368 may be used above, it will be recognized that similar calculations using other combinations of isovelocity sound paths can yield an isovelocity range and other isovelocity propagation path angles. For example, a surface reflected path and the direct path can be used.

The isovelocity propagation path angles labeled E and F can be used in further estimations described below in conjunction with FIG. 9A, in order to find a subsequent starting point, also referred to above as an estimated range/assumed depth, which is associated with the assumed depth 364. However, in accordance with the process described above in FIG. 3B, in some embodiments, the estimated range and assumed depth represented directly by the point 370 can serve as the starting point.

Referring now to FIG. 9A, in which like elements of FIG. 9 are shown having like reference designations, a scenario 380 shows how the angles labeled E and F in FIG. 9 can be used to identify a starting point, i.e., an estimated range/assumed depth, represented by block 28b of FIG. 3A, and how the starting point can be used to identify a resolved range, represented by block 144 for FIG. 4.

A direct propagation path 382 (first path) and a direct propagation path 384 (second path) are generated using a selected propagation model, for example a ray trace propagation model, using the arrival angles labeled E and F, which were identified from isovelocity propagation paths 366, 368 of FIG. 9. As described above, while the propagation paths 382, 384 are represented by straight lines, it will be recognized that the propagation paths using the selected propagation model need not be straight.

The direct path 382 results in a point 394 at the assumed depth 364. The direct path 384 results in a point 396 at the assumed depth 212. The two points 394, 396 (ranges) can first be combined in order to find a starting point 398, i.e., an estimated range/assumed depth. The estimated range/assumed depth is described above, fro example, in conjunction with block 28 of FIG. 1, block 28a of FIG. 3, block 28b of FIG. 3A, and block 28c or FIG. 3B.

The starting point 398 can be selected by techniques described above in conjunction with FIG. 5. The starting point 398 can be used in conjunction with the selected propagation model, selected, for example at block 132 of FIG. 4, in order to identify a first modified propagation path 386 and a second modified propagation path 388, which both pass through the estimated range/assumed depth starting point 398, as described, for example, in conjunction with blocks 134, 136 of FIG. 4. In accordance with block 138 of FIG. 4, a time delay difference of the first and second modified propagation paths 386, 388 can be computed. In accordance with block 140 of FIG. 4, the time delay difference can be compared with a time delay of an identified correlation feature.

Sound arriving at the sound sensors 362, 360 can be cross correlated by the sonar system 356, resulting in a correlation feature having a time delay, an amplitude, and a phase, which can be measured, for example, in block 22 of FIG. 1 and block 22b of FIG. 2A. It will be understood that the measured time delay of the correlation feature can correspond to a time delay between an actual (not modeled) direct propagation path and another actual direct propagation path.

The above described calculated time delay difference between the propagation paths 386, 388 can be compared to the above-described measured time delay associated with the identified correlation feature, which, in this case, is a correlation feature in an autocorrelation. If the time delay difference is too large, the point 398 can be moved in range at the assumed depth 364, for example to the right. At each movement, in accordance with block 142 of FIG. 4, the time delay difference is examined to identify if the time delay difference is sufficiently small, i.e., below a time delay difference threshold. Eventually, after one of more movements of the point 398, a point 400 is identified at which the time delay difference is sufficiently small. The point 400 corresponds to the above-described resolved range/assumed depth identified at block 144 of FIG. 4.

The resolved range/assumed depth 400 has a first resolved propagation path 390 with a first resolved path angle (not labeled) at the sonar system 356 and a second resolved propagation path 392 having a second resolved path angle (not labeled) at the sonar system 356.

It will be appreciated that the point 400 can corresponds to but one of a plurality of resolved ranges/assumed depths identified by the process 10 of FIG. 1. One localized angle/localized depth is selected from among the plurality of resolved ranges/assumed depths described above in conjunction with FIG. 4.

Figure 10:
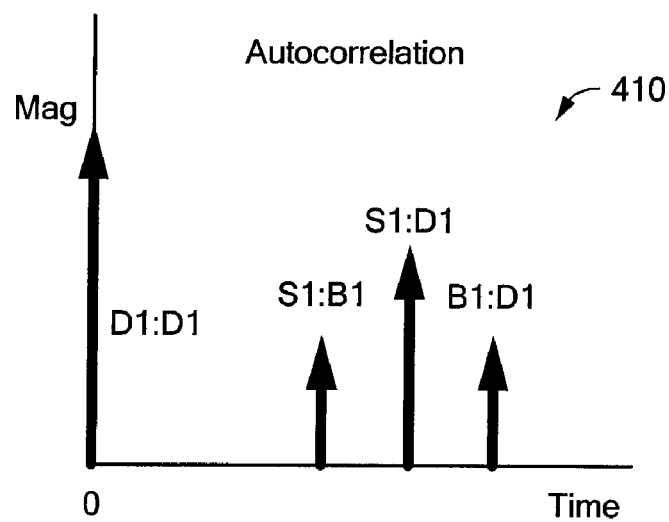
FIG. 10 is a graph showing correlation features achieved by an autocorrelation.

Referring now to FIG. 10, a graph 410 includes a horizontal scale in units of time in arbitrary units and a vertical scale in units of magnitude in arbitrary units. Features labeled D1, S1:B1, S1:D1, and B1:D1 correspond to correlation feature in an output of an autocorrelation, where S refers to a surface reflected propagation path, D refers to a direct propagation path, and B refers to a bottom reflected propagation path. Therefore, for example, S1:B1 refers to a correlation feature associated with a propagation path pair corresponding to a surface reflected propagation path and a bottom reflected propagation path.

While three correlation features are shown, it should be understood that there can be other correlation features corresponding to other combinations of propagation paths.

Figure 11:
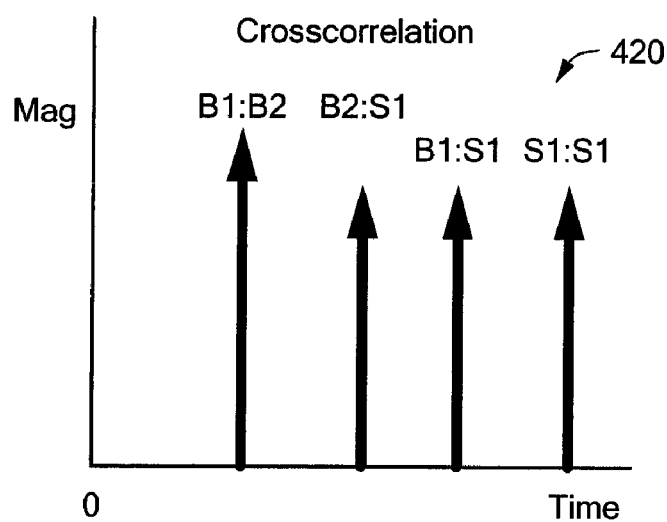
FIG. 11 is a graph showing correlation features achieved by a cross correlation.

Referring now to FIG. 11, a graph 420 includes a horizontal scale in units of time in arbitrary units and a vertical scale in units of magnitude in arbitrary units. Features labeled B1:B2, B2:S1, B1:S1, and S1:S1 correspond to correlation feature in an output 410 of a cross correlation, where S refers to a surface reflected propagation path, D refers to a direct propagation path, B refers to a bottom reflected propagation path, 1 refers to a path to a first sound sensor or array, and 2 refers to a path to a second sound sensor or array. Therefore, for example B1:B2 refers to a correlation feature associated with a propagation path pair corresponding to a bottom reflected propagation path to a first sound sensor and a bottom reflected propagation path to a a second sound sensor.

While four correlation features are shown, it should be understood that there can be other correlation features corresponding to other combinations of propagation paths.

Referring now to FIG. 12, a sonar system 430 can be the same as or similar to any of the sonar system 156, 206, 256, 316, 356 of FIGS. 5-9A. The sonar system can include one or more sound sensors 432 adapted to generate electronic signals 434, 446 in response to a received sound signal.

The sonar system can (optionally) include a beamformer 436 coupled to the one or more sound sensors 432 and adapted to generate a beamformed signal 438. An autocorrelation processor 440 is adapted to generate a correlation signal 442 in response to the beamformed signal 438. A correlation feature identification processor 444 is adapted to identify a correlation feature 456 in the correlation signal 442. A correlation feature parameter measurement processor 458 is adapted to measure a parameter of the identified correlation feature 456 and to generate measured correlation feature values 460. A path pair identification processor 462 is adapted to assume a depth of the target and adapted to select a propagation path pair 464 associated with the identified correlation feature 456 and with the assumed depth. An estimated range/assumed depth processor 466 is adapted to estimate a range of the target 468 at the assumed depth using the identified propagation path pair 464. A range resolution processor 470 is adapted to process the estimated range 468 of the target at the assumed depth to provide a resolved range 472 of the target at the assumed depth and an associated first resolved propagation path pair 472. A likelihood estimation processor 474 is adapted to assign a likelihood factor 476 to the resolved range 472 of the target at the assumed depth. A localization processor 478 is adapted to process the likelihood factor 478 and to generate a localization signal 480, which localizes the target in depth and in range based upon the likelihood factor 478.

In some embodiments, the sonar system 430 also (optionally) includes another beamformer 448 coupled to the one or more sound sensors 432 and adapted to generate another beamformed signal 438. A cross correlation processor 452 is adapted to generate a correlation signal 454 associated with the beamformed signals 450, 438. The correlation feature identification processor 444 is adapted to identify another correlation feature 456 in the correlation signal 454.

Figure 13:
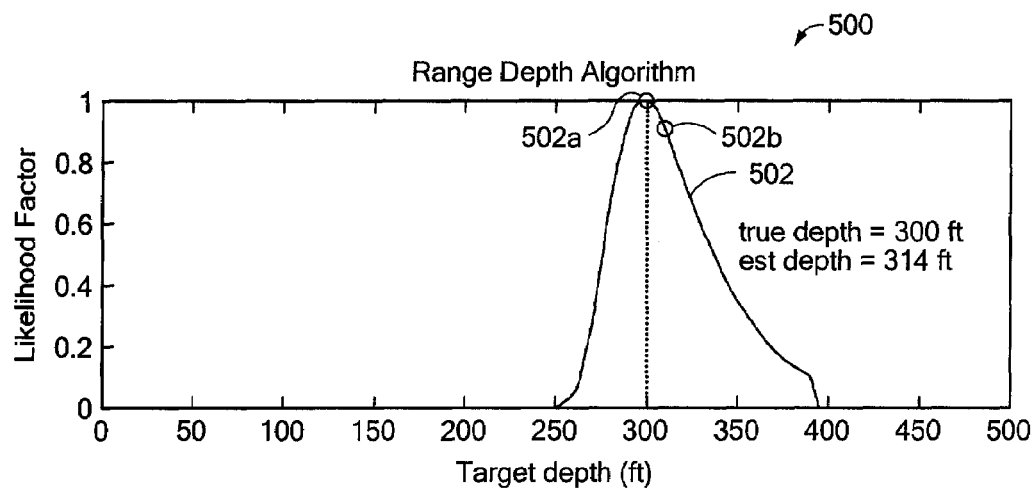
FIG. 13 is a graph showing one technique for finding a localized depth of an underwater target.
Figure 14:
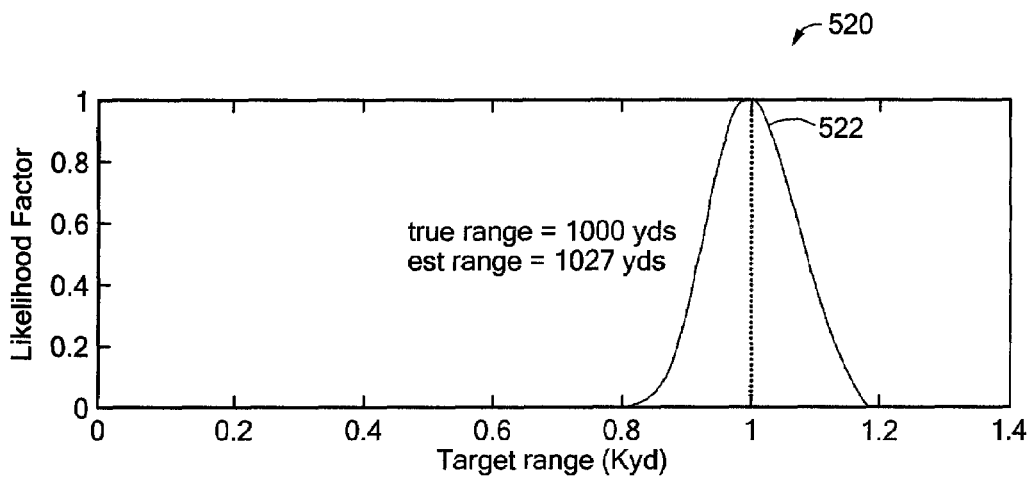
FIG. 14 is a graph showing one technique for finding a localized range of the underwater target.
Figure 15:
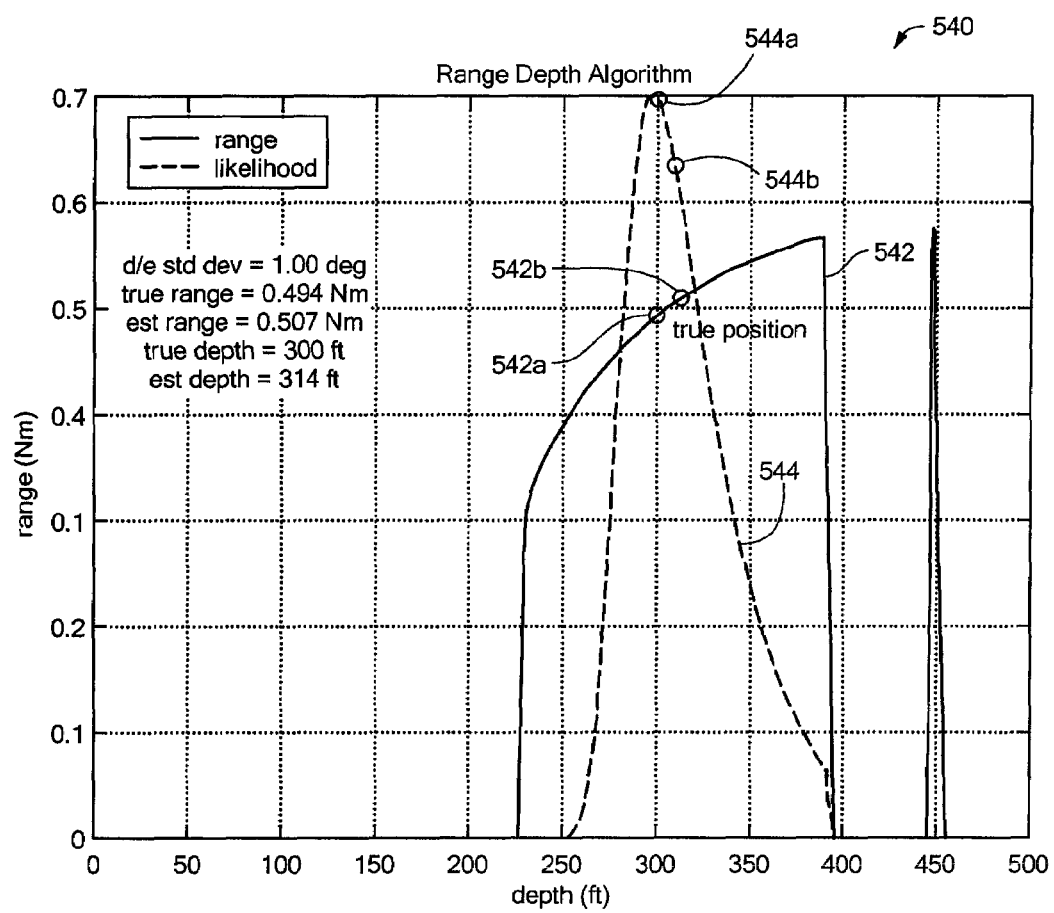
FIG. 15 is a graph showing one technique for finding a localized depth and range of the underwater target in accordance with the graph of FIG. 13.

FIGS. 13, 14 and 15 present results for an illustrative case. However, before turning to FIGS. 13-15, some general background discussion is presented.

The above-described likelihood factor is a measure of the quality of a solution for range and depth. In some embodiments, the likelihood factor is formed by a multiplicative chain of likelihood factors (also referred to below as quality factors). The quality factors can be associated with a system, measurement, or solution constraint. In one arrangement described above, an angle likelihood (quality) factor can be indicative of the likelihood of a valid solution based on a measured angle, a calculated angle, and an uncertainty associated with the measurement and/or calculation. In another arrangement described above, a quality factor can be determined in conjunction with a set of assumed arrival path-pairs being matched to a set of correlation time delay measurements. In this arrangement, the quality factor is related to the variance of the multiple estimates of source range. Another likelihood factor can be a combination, for example, a product, of the above likelihood factors.

Referring now to FIG. 13, a graph 500 includes a horizontal scale in units of target depth in feet and a vertical scale in units of the above described likelihood factor. A curve 502 shows (a simulation of) a normalized likelihood for the above-described assumed depths, computed by summing the likelihood factors over all resolved range/ray path pair combinations for each assumed depth, each resolved range computed by the process of FIG. 1, and each one of normalized likelihood factors plotted against its associated target depth. The curve 502 is non-symmetrical and has a peak at three hundred feet target depth, typified by a point 502a. A weighted average of the curve 502 occurs at approximately three hundred fourteen feet, typified by a point 502b.

In some embodiments, the peak depth at three hundred feet can be used as the localized target depth. However, in other embodiments, the depth of three hundred fourteen feet can be used as the localized target depth.

Referring now to FIG. 14, a graph 520 includes a horizontal scale in units of target range in kiloyards (Kyds) and a vertical scale in units of the above described likelihood factor. A curve 522 shows (a simulation of) a normalized target range likelihood factor as a function of target range. This normalized range likelihood factor is computed from the distribution of the likelihood factors of the above-described resolved ranges/assumed depths computed by the process of FIG. 1. The curve 522 is non-symmetrical and has a peak at one kiloyard target range. A weighted average of the curve 522 occurs at approximately 1.027 kiloyards.

In some embodiments, the peak range at one kiloyard can be used as the localized range. However, in other embodiments, the range of 1.027 kiloyards can be used as the localized target range.

Referring now to FIG. 15, a graph 540 includes a horizontal scale in units of target depth in feet and a vertical scale in units of target range in nautical miles (Nm) and a vertical scale in units of the above described likelihood factor. A curve 542 shows (a simulation of) the joint variation of the above-described resolved ranges/assumed depths computed by the process of FIG. 1, plotted in range and in depth.

The curve 542 shows (a simulation of) average resolved target range, computed by a likelihood factor weighted average over all path pair combinations for each of the above-described assumed depths computed by the process of FIG. 1. A curve 544 shows (a simulation of) the unnormalized depth likelihood factor of each one of the target depths plotted against its associated assumed depth, in accordance with the curve 502 (scaled) of FIG. 13. As described above in conjunction with FIG. 13, the curve 544 is non-symmetrical and has a peak at three hundred feet target depth, typified by a point 544a. A weighted average of the curve 544 occurs at approximately three hundred fourteen feet, typified by a point 544b.

The point 544a aligns on the curve 542 with a point 542a at a target range of 0.494 nautical miles (1000 yards). The point 544b aligns on the curve 542 with a point 542b at a target range of 0.507 nautical miles (1027 yards).

In some embodiments, the peak at three hundred feet can be used as the localized depth and the corresponding range of 0.497 nautical miles can be used as the localized target range. However, in other embodiments, the depth of three hundred fourteen feet can be used as the localized target depth and the corresponding range of 0.507 nautical miles can be used as the localized target range, which are generated by the above described weighted averages.

The graphs 500, 520, 540 of FIGS. 13, 14, 15, respectively, are indicative of but one way in which the resolved ranges/assumed depths and the likelihood factors associated therewith generated by the process 10 of FIG. 1 can be combined to achieve a localized range and localized depth of the target. Other techniques can also be used without departure from the present invention.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of determining a range and a depth of an underwater target, comprising:
   receiving a sound signal from the target, wherein the sound signal includes a plurality of sound signal portions, each one of the sound signal portions propagating on a respective one of a plurality of propagation paths, wherein any two of the propagation paths correspond to a propagation path pair;
   converting the sound signal to one or more electronic signals;
   generating a correlation signal associated with at least one of the one or more electronic signals;
   identifying a correlation feature in the correlation signal;
   measuring a parameter of the identified correlation feature;
   assuming a depth of the target;
   selecting a propagation path pair associated with the identified correlation feature and with the assumed depth;
   estimating a range of the target at the assumed depth using the selected propagation path pair;
   processing the estimated range of the target at the assumed depth to provide a resolved range of the target at the assumed depth and an associated first resolved propagation path pair; and
   assigning a likelihood factor to the resolved range of the target at the assumed depth.

2. The method of claim 1, further comprising:
   selecting a second propagation path pair associated with the identified correlation feature and with the assumed depth;
   estimating a second range of the target at the assumed depth using the selected second propagation path pair;
   processing the second estimated range of the target at the assumed depth to provide a second resolved range of the target at the assumed depth and an associated second resolved propagation path pair;
   assigning a second likelihood factor to the second resolved range; and
   selecting from among the resolved range and the second resolved range.

3. The method of claim 1, further comprising:
   assuming a second depth of the target;
   selecting a second propagation path pair associated with the identified correlation feature and with the second assumed depth;
   estimating a second range of the target at the second assumed depth using the selected second propagation path pair;
   processing the second estimated range of the target at the second assumed depth to provide a second resolved range at the second assumed depth;
   assigning a second likelihood factor to the second resolved range; and
   selecting from among the resolved range and the second resolved range.

4. The method of claim 1, further comprising:
   identifying a second correlation feature in the correlation signal;
   measuring a parameter of the second identified correlation feature;
   selecting a second propagation path pair associated with the second identified correlation feature and with the assumed depth;
   estimating a second range of the target at the assumed depth using the selected second propagation path pair;
   processing the second estimated range of the target at the assumed depth to provide a second resolved range of the target at the assumed depth;
   assigning a second likelihood factor to the second resolved range; and
   selecting from among the resolved range and the second resolved range.

5. The method of claim 1, further comprising:
   generating a second correlation associated with at least one of the one or more electronic signals to provide a second correlation signal;
   identifying a second correlation feature in the second correlation signal;
   measuring a parameter of the second identified correlation feature;
   selecting a second propagation path pair associated with the second identified correlation feature and with the assumed depth;
   estimating a second range of the target at the assumed depth using the selected second propagation path pair;
   processing the second estimated range of the target at the assumed depth to provide a second resolved range of the target at the assumed depth;
   assigning a second likelihood factor to the second resolved range; and
   selecting from among the resolved range and the second resolved range.

6. The method of claim 1, wherein at least one of the generating a correlation, the identifying a correlation feature, the assuming a depth, or the selecting a propagation path pair are repeated to provide at least one of another correlation signal, another identified correlation feature, another assumed depth, or another selected propagation path pair, as well as to provide another estimated range of the target, another resolved range of the target, and another likelihood factor, wherein the process further comprises selecting from among the resolved range and the another resolved range.

7. The method of claim 1, wherein the converting the sound signals to one or more electronic signals comprises beamforming to provide the one or more electronic signals associated with respective acoustic beams, each acoustic beam having a respective beam angle, wherein the method further comprises:
identifying at least one of a first arrival angle of the first sound signal portion or a second arrival angle of the second sound signal portion.

8. The method of claim 7, wherein the selecting a propagation path pair comprises:
selecting an estimated range propagation model;
identifying a first propagation path, using the estimated range propagation model, having an arrival angle near to an arrival angle associated with a first beam angle;
identifying a second propagation path, using the estimated range propagation model, having an arrival angle near to an arrival angle associated with a second beam angle;
solving for a first range of the target at the assumed depth along the first identified propagation path;
solving for a second range of the target at the assumed depth along the second identified propagation path; and
combining the first range with the second range to identify the estimated range of the target at the assumed depth.

9. The method of claim 8, wherein the processing the estimated range of the target comprises:
selecting a range resolution propagation model;
identifying a first modified propagation path, using the range resolution propagation model, passing through the estimated range at the assumed depth;
identifying a second modified propagation path, using the range resolution propagation model, passing through the estimated range at the assumed depth;
calculating a time delay difference between the first modified propagation path and the second modified propagation path;
comparing the calculated time delay difference between the first modified propagation path and the second modified propagation path with a measured time delay of the identified correlation feature; and
moving the estimated range of the target at the assumed depth to a resolved range of the target at the assumed depth in accordance with the time delay comparison, wherein the resolved range of the target at the assumed depth is associated with a first resolved propagation path having a first resolved path angle and a second resolved propagation path having a second resolved path angle.

10. The method of claim 9, wherein the assigning a likelihood factor comprises at least one of:
comparing the first resolved path angle with the first measured arrival angle; or
comparing the second resolved path angle with the second measured arrival angle.

11. The method of claim 1, wherein the selecting a propagation path pair comprises:
selecting an estimated range propagation model;
identifying a first isovelocity propagation path having a first isovelocity arrival angle, using an isovelocity propagation model;
identifying a second isovelocity propagation path having a second isovelocity arrival angle, using an isovelocity propagation model;
identifying a first propagation path, using the selected propagation model, having an arrival angle near to the first isovelocity arrival angle;
identifying a second propagation path, using the selected propagation model, having an arrival angle near to the second isovelocity arrival angle;
solving for a first range of the target at the assumed depth along the first identified propagation path;
solving for a second range of the target at the assumed depth along the second identified propagation path; and
combining the first range with the second range to identify the estimated range of the target at the assumed depth.

12. The method of claim 11, wherein the processing the estimated range of the target comprises:
selecting a range resolution propagation model;
identifying a first modified propagation path, using the range resolution propagation model, passing through the estimated range at the assumed depth;
identifying a second modified propagation path, using the range resolution propagation model, passing through the estimated range at the assumed depth;
calculating a time delay difference between the first modified propagation path and the second modified propagation path;
comparing the calculated time delay difference between the first modified propagation path and the second modified propagation path with a measured time delay of the identified correlation feature; and
moving the estimated range at the assumed depth to a resolved range of the target at the assumed depth in accordance with the time delay comparison, wherein the resolved range of the target at the assumed depth is associated with a first resolved propagation path having a first resolved path angle and a second resolved propagation path having a second resolved path angle.

13. The method of claim 12, wherein the assigning a likelihood factor comprises:
calculating a characteristic value of a calculated characteristic associated with the first and second resolved propagation paths;
measuring a characteristic value of a measured characteristic associated with the received sound signal; and
comparing the calculated characteristic value with the measured characteristic value.

14. The method of claim 13, wherein the measured characteristic comprises a selected one of a measured amplitude of the identified correlation feature, a measured phase of the identified correlation feature, or a measured time delay of the identified correlation feature, and wherein the calculated characteristic comprises a corresponding selected one of a calculated amplitude of a calculated correlation feature, a calculated phase of the calculated correlation feature, or a calculated time delay of the calculated correlation feature.

15. The method of claim 1, wherein the assigning a likelihood factor comprises:
  calculating a characteristic value of a calculated characteristic associated with the first and second resolved propagation paths;
  measuring a characteristic value of a measured characteristic associated with the received sound signal; and
  comparing the calculated characteristic value with the measured characteristic value.

16. The method of claim 15, wherein the measured characteristic comprises a selected one of a measured amplitude of the identified correlation feature, a measured phase of the identified correlation feature, or a measured time delay of the identified correlation feature, and wherein the calculated characteristic comprises a corresponding selected one of a calculated amplitude of a calculated correlation feature, a calculated phase of the calculated correlation feature, or a calculated time delay of the calculated correlation feature.

17. The method of claim 15, further comprising:
  combining the likelihood factor and the resolved range of the target at the assumed depth to provide a localized range of the target and a localized depth of the target.

18. A system for determining a range and a depth of an underwater target, comprising:
  at least one sound transducer adapted to receive a sound signal from the target, wherein the sound signal includes a plurality of sound signal portions, each one of the sound signal portions propagating on a respective one of a plurality of propagation paths, wherein any two of the propagation paths correspond to a propagation path pair, wherein the at least one sound sensor is adapted to convert the sound signal to one or more electronic signals;
  a correlation processor adapted to generate a correlation signal associated with at least one of the one or more electronic signals;
  a correlation feature identification processor adapted to identify a correlation feature in the correlation signal;
  a correlation feature parameter measurement processor adapted to measure a parameter of the identified correlation feature and to generate measured correlation feature values;
  a path pair identification processor adapted to assume a depth of the target and adapted to select a propagation path pair associated with the identified correlation feature and with the assumed depth;
  an estimated range/assumed depth processor adapted to estimate a range of the target at the assumed depth using the selected propagation path pair;
  a range resolution processor adapted to process the estimated range of the target at the assumed depth to provide a resolved range of the target at the assumed depth and an associated first resolved propagation path pair; and
  a likelihood estimation processor adapted to assign a likelihood factor to the resolved range of the target at the assumed depth.

19. The system of claim 18, wherein the conversion processor comprises a beamformer adapted to combine the one or more electronic signals to provide one or more acoustic beams.

20. The system of claim 18, wherein the correlation processor comprises a cross correlation processor.

21. The system of claim 18, wherein the correlation processor comprises an autocorrelation processor.

22. The system of claim 18, wherein the measured parameter of the identified correlation feature comprises a time delay.

23. The system of claim 18, further including a localization processor adapted to combine the likelihood factor and the resolved range of the target at the assumed depth to provide a localized range of the target and a localized depth of the target.

* * * * *

UNITED STATES PATENT AND TRADEMARK OFFICE
CERTIFICATE OF CORRECTION

PATENT NO. : 7,315,488 B2
APPLICATION NO. : 11/422435
DATED : January 1, 2008
INVENTOR(S) : Novick et al.

It is certified that error appears in the above-identified patent and that said Letters Patent is hereby corrected as shown below:

Title Page, item [57] Abstract, line 1 delete "A to method" and replace with --A method--.

Column 4, lines 35-36 delete ", for example at" and replace with --, for example, at--.

Column 4, line 55 delete "Through" and replace with --Though--.

Column 4, line 56 delete "s" and replace with --a--.

Column 5, line 33 delete "stated the" and replace with --stated, the--.

Column 5, line 49 delete ", for example to" and replace with --, for example, to--.

Column 6, line 2 delete "can bounded by" and replace with --can be bounded by--.

Column 6, line 9 delete "exist" and replace with --exists--.

Column 6, line 36 delete ", through there exist" and replace with --, though there exists--.

Column 7, line 8 delete "block 18-32" and replace with --blocks 18-32--.

Column 7, line 43 delete "example an" and replace with --example, an--.

Column 7, line 61 delete "two an angles" and replace with --two angles--.

Column 8, line 28 delete "example an" and replace with --example, an--.

Column 8, line 47 delete "with of FIG. 2." and replace with --with FIG. 2.--.

Column 10, line 50 delete "isolvelocity" and replace with --isovelocity--.

Column 11, line 44 delete "to toward" and replace with --to be toward--.

Column 12, line 18 delete "by equation" and replace with --by the equation--.

Column 13, line 9 delete "(FIG. 1." and replace with --(FIG. 1).--.

UNITED STATES PATENT AND TRADEMARK OFFICE
CERTIFICATE OF CORRECTION

PATENT NO. : 7,315,488 B2
APPLICATION NO. : 11/422435
DATED : January 1, 2008
INVENTOR(S) : Novick et al.

It is certified that error appears in the above-identified patent and that said Letters Patent is hereby corrected as shown below:

Column 14, line 28 delete "one" and replace with --on--.

Column 15, line 9 delete "though" and replace with --through--.

Column 15, line 22 delete "above described" and replace with --above-described--.

Column 15, line 32 delete "of" and replace with --or--.

Column 15, line 42 delete "corresponds" and replace with --correspond--.

Column 15, line 49 delete "for system" and replace with --for a system--.

Column 15, line 51 delete "an" and replace with --a--.

Column 16, line 35 delete "....+2a)+$R^2$" and replace with --....+2a$)^2$ + $R^2$--.

Column 16, line 53 delete "...SR(D1)..." and replace with --...SR(D1)=...--.

Column 17, line 60 delete "or" and replace with --of--.

Column 17, line 63 delete "another," and replace with --other,--.

Column 18, line 23 delete "above described" and replace with --above-described--.

Column 18, line 42 delete "corresponds" and replace with --correspond--.

Column 18, lines 49-50 delete "for system that does uses" and replace with --for a system that uses--.

Column 18, line 66 delete ", cylindrical" and replace with --, a cylindrical--.

Column 19, line 11 delete "describe" and replace with --described--.

Column 20, line 2 delete "for" and replace with --of--.

Column 20, line 22 delete "another," and replace with --other,--.

Column 20, line 49 delete "above described" and replace with --above-described--.

UNITED STATES PATENT AND TRADEMARK OFFICE
CERTIFICATE OF CORRECTION

PATENT NO. : 7,315,488 B2
APPLICATION NO. : 11/422435
DATED : January 1, 2008
INVENTOR(S) : Novick et al.

It is certified that error appears in the above-identified patent and that said Letters Patent is hereby corrected as shown below:

Column 21, line 1 delete "corresponds" and replace with --correspond--.

Column 21, line 12 delete "autocorrelation correlation" and replace with

--autocorrelation--.

Column 21, line 23 delete "cylindrical" and replace with --a cylindrical--.

Column 22, line 14 delete "though" and replace with --through--.

Column 22, line 26 delete "above described" and replace with --above-described--.

Column 22, line 36 delete "of" and replace with --or--.

Column 22, line 46 delete "corresponds" and replace with --correspond--.

Column 23, line 4 delete ", cylindrical" and replace with --, a cylindrical--.

Column 23, line 67 delete "for" and replace with --of--.

Column 24, line 15 delete "fro" and replace with --for--.

Column 24, line 17 delete "or" and replace with --of--.

Column 24, line 40 delete "above described" and replace with --above-described--.

Column 24, line 50 delete "of" and replace with --or--.

Column 24, line 60 delete "corresponds" and replace with --correspond--.

Column 25, line 3 delete "Feature" and replace with --Features--.

Column 25, line 17 delete "Feature" and replace with --Features--.

Column 26, line 25 delete "above described" and replace with --above-described--.

Column 26, lines 30-31 delete "of normalized" and replace with --of the normalized--.

Column 26, line 43 delete "above described" and replace with --above-described--.

UNITED STATES PATENT AND TRADEMARK OFFICE
CERTIFICATE OF CORRECTION

PATENT NO. : 7,315,488 B2
APPLICATION NO. : 11/422435
DATED : January 1, 2008
INVENTOR(S) : Novick et al.

It is certified that error appears in the above-identified patent and that said Letters Patent is hereby corrected as shown below:

Column 26, line 59 delete "above described" and replace with --above-described--.

Column 27, line 21 delete "above described" and replace with --above-described--.

Signed and Sealed this

Sixteenth Day of September, 2008

JON W. DUDAS
*Director of the United States Patent and Trademark Office*